(12) United States Patent
He et al.

(10) Patent No.: US 8,340,884 B1
(45) Date of Patent: Dec. 25, 2012

(54) FUEL SAVING METHOD AND DEVICE FOR VEHICLE

(76) Inventors: Jing He, Burbank, CA (US); Hongping He, Bakersfield, CA (US)

( * ) Notice: Subject to any disclaimer, the term of this patent is extended or adjusted under 35 U.S.C. 154(b) by 531 days.

(21) Appl. No.: 12/653,826

(22) Filed: Dec. 21, 2009

Related U.S. Application Data

(60) Provisional application No. 61/140,906, filed on Dec. 26, 2008, provisional application No. 61/184,820, filed on Jun. 7, 2009, provisional application No. 61/223,058, filed on Jul. 5, 2009.

(51) Int. Cl.
*G06F 19/00* (2006.01)
*G01F 9/02* (2006.01)

(52) U.S. Cl. ............ 701/103; 701/110; 701/54; 340/439

(58) Field of Classification Search .................. None
See application file for complete search history.

(56) References Cited

U.S. PATENT DOCUMENTS

| | | | |
|---|---|---|---|
| 4,078,631 A * | 3/1978 | Kadota et al. ............. | 180/179 |
| 5,477,452 A | 12/1995 | Milunas et al. | |
| 5,688,207 A | 11/1997 | Uchida et al. | |
| 6,035,825 A | 3/2000 | Worth et al. | |
| 6,270,443 B1 | 8/2001 | Ito et al. | |
| 6,295,487 B1 | 9/2001 | Ono et al. | |
| 6,315,068 B1 | 11/2001 | Hoshiya et al. | |
| 6,356,831 B1 | 3/2002 | Michelini et al. | |
| 6,600,413 B1 | 7/2003 | Lo | |
| 6,726,594 B2 | 4/2004 | Mizuno et al. | |
| 6,752,226 B2 | 6/2004 | Naito et al. | |
| 6,766,874 B2 | 7/2004 | Naito et al. | |
| 6,985,804 B2 | 1/2006 | Minami | |

(Continued)

FOREIGN PATENT DOCUMENTS

EP  0 919 419 A1  6/1999

(Continued)

OTHER PUBLICATIONS

Honda's Insight hybrid marks the sweet spot, MSNBC.COM, 3 pages, Jan. 23, 2009.

(Continued)

*Primary Examiner* — Michael J. Zanelli
(74) *Attorney, Agent, or Firm* — David L. Hoffman; Hoffman Patent Group

(57) ABSTRACT

A system and method for maximizing a vehicle's fuel efficiency preferably without inconveniencing the driver, includes maximizing a ratio of a real-time parameter proportional to engine load or engine power to fuel flow or air flow rate referred to herein as the P/F ratio. This ratio is calculated to evaluate engine fuel efficiency. With the system and method, the throttle is operated incrementally to increase or decrease the throttle in a manner to maximize the P/F ratio, thus maximizing fuel efficiency, in a pulse phase. The system and method implement an on and off pulse width modulation ("PWM") style of control to modulate engine power and acceleration to achieve the speed that the driver desires, based on the position of the accelerator pedal. When the desired speed is achieved, the throttle is released and when the speed drops a sufficient amount, the throttle is re-engaged to reach the desired speed again. When the throttle is disengaged or when the driver releases the accelerator pedal, the system and method implement a glide phase, where the vehicle coasts without use of fuel or in neutral with very limited use of fuel and minimum engine drag.

48 Claims, 10 Drawing Sheets

U.S. PATENT DOCUMENTS

| | | | |
|---|---|---|---|
| 7,016,773 | B2 | 3/2006 | Kuroda et al. |
| D538,721 | S | 3/2007 | Woodard, Jr. et al. |
| 7,463,962 | B2 | 12/2008 | Brunemann et al. |
| 7,505,837 | B2 | 3/2009 | Somos |
| 7,512,477 | B2 | 3/2009 | Quigley et al. |
| 7,565,235 | B2 | 7/2009 | Okada et al. |
| 7,577,503 | B2 | 8/2009 | Bertosa et al. |
| 2004/0084237 | A1 | 5/2004 | Petrie, Jr. |
| 2004/0204192 | A1 | 10/2004 | Holloway et al. |
| 2007/0203625 | A1* | 8/2007 | Quigley et al. ............ 701/33 |
| 2009/0043467 | A1 | 2/2009 | Filev et al. |
| 2009/0118939 | A1 | 5/2009 | Heap et al. |
| 2009/0118941 | A1 | 5/2009 | Heap |
| 2010/0081544 | A1* | 4/2010 | Warner ................ 477/121 |

FOREIGN PATENT DOCUMENTS

| | | |
|---|---|---|
| WO | WO 82/02567 | 8/1982 |
| WO | WO 03/076788 A1 | 9/2003 |
| WO | WO 2007/073446 A1 | 6/2007 |

OTHER PUBLICATIONS

The OBD II Home Page, OBD-II Background, published by AutoTap, 8 pages printed Aug. 29, 2009.

The 2010 Insight Hybrid, published by Honda; 8 pages, printed Jun. 12, 2009.

* cited by examiner

FUEL SAVING METHOD AND DEVICE FOR VEHICLE

CROSS REFERENCE TO RELATED APPLICATION(S)

This application claims priority from U.S. Provisional Patent Application Ser. Nos. 61/140,906 filed Dec. 26, 2008; 61/184,820, filed Jun. 7, 2009; and 61/223,058, filed Jul. 5, 2009, and which all are incorporated by reference herein.

BACKGROUND OF THE INVENTION

1. Field of the Invention

The present invention pertains to improving or maximizing fuel efficiency for vehicles that use an internal combustion engine for power.

2. Description of the Related Art

There are many motivations for improving fuel economy of road vehicles (and other vehicles). Transportation represents a significant portion of global energy use. In the United States, for example, the EPA estimates that transportation accounts for approximately twenty five percent of all energy use. Vehicles that consume more fuel emit more greenhouse gases and contribute more significantly to global warming. Given the rapid depletion and increasing scarcity of fossil fuels, gas prices have historically been rising. Gas prices are bound to rise even more substantially in the future. With high fuel prices, more and more consumers will find fuel efficient vehicles desirable for their budget. Society therefore urgently seeks to improve fuel economy. It will become more and more urgent, as evidenced by the passing of the national fleet mileage rule under President Obama.

Of all the components of a typical car that play a role in fuel economy, the vehicle's engine is the most influential factor. As the only source of power for the typical (nonhybrid and nonelectric) automobile, the efficiency of the engine ultimately limits the fuel efficiency of the vehicle.

For many years, vehicles and engines have constantly undergone redesign with fuel efficiency in mind. Yet, in the thirty six years since the first oil crisis in 1973, the fuel economy for comparable vehicles relying solely on internal combustion engines for power has not gone up by a significant amount. Although the typical engine has undeniably been improved in design and performance, there remains a trade-off between vehicle performance and fuel economy. Overall vehicle performance has increased at the cost of fuel economy. To achieve better acceleration and comfort, and/or to carry heavier loads, bigger engines with higher outputs are needed. However, bigger engines also consume more fuel. Compact cars have been known to achieve excellent fuel economy, but they are also unable to fulfill the needs that are met by large sedans, SUVs and trucks, which have relatively poor fuel economy.

As engine conditions (i.e. load and RPM) vary, the efficiency of the engine (amount of work done per unit of fuel consumed) can change dramatically. The typical internal combustion engine used in automobiles operates most efficiently around approximately sixty percent of the maximum engine power output at a certain speed. The most efficient region of operation varies from engine to engine. Consider the fact that the typical mid-size sedan has around 150 peak hp, while maintaining highway speeds only requires the engine to output 30 hp, only about twenty percent of maximum engine power. While maintaining city or local speeds, the engine of the typical mid-size sedan uses even less power, and an even smaller portion of maximum power. This means that under typical driving conditions, with the driver's foot continuously on the throttle to maintain the vehicle at approximately the same speed, the engine is operating at a low percentage of its maximum power, and not in a fuel efficient region.

With conventional driving methods, the engine runs under low power (and efficiency) most of the time, with an increase in power and in efficiency only at certain short moments such as when accelerating from a stop or to pass another vehicle. Accordingly, for the majority of the time the typical driver drives the vehicle under conditions that make the engine use fuel relatively inefficiently. Conventional wisdom is to maintain a level speed, avoid acceleration, avoid "jack-rabbit" starts and stops, and if one has to accelerate, to accelerate as smoothly and gently as possible to save fuel. However, this conventional driving method results in fuel efficiency that falls well short of the vehicle's potential fuel economy because this conventional method only uses a small percentage of engine's maximum power output.

Compact cars, with their smaller engines, are more fuel efficient precisely because smaller engines output less maximum power and produce poorer acceleration. Therefore, under normal driving conditions, the driver already uses the engine closer to its optimal efficiency region for a larger proportion of the time than if he or she were to drive a vehicle with a larger engine, such as an SUV.

To increase fuel economy, industry specialists have focused almost exclusively on how to make more use of the engine's most fuel efficient operating region, or "sweet spot", under normal driving conditions. For example, manufacturers have come up with a way to make vehicles that can run with only half of its cylinders working (U.S. Pat. No. 4,383,514 to Fiala). Thus, a six cylinder engine could shut off half of its cylinders, and run its other three cylinders at higher efficiency to accomplish the same amount of work using less fuel than running all six cylinders under a lower percentage of maximum power (lower efficiency). The benefit of this approach is that the vehicle can still reap the performance benefits of having a bigger engine for bursts of acceleration, while for times when less acceleration is needed the vehicle uses an effectively smaller engine running in a more efficient state to do the work. This approach in engine design is particularly effective for larger vehicles. However, there is still no guarantee that the engine will operate near or at peak efficiency and certainly not anywhere near all the time. There is only an increased efficiency that may be reached and not an optimal efficiency.

Hybrids are currently the most effective method to improve fuel economy. It is possible for a hybrid's engine (using combustion) to stay in the most efficient region much of the time. Hybrids may use a small engine (combustion) that is turned off at low speeds when the engine will not be able to run in the most efficient region, when the motor (electric) is used instead. When the engine is used, it is started and fixed in an efficient state, with adjustments made to motor power to handle varying load conditions. For example, if the engine running in the sweet spot does not provide enough power, the motor can be used to supplement the power needed to drive the vehicle. By contrast, if the engine running in the efficient state provides more power than is needed, the motor can be used to turn the excess portion of the power the engine produces into electricity that is then stored in the batteries for the motor to use. Thus the engine in a hybrid is either on and operating in and efficient state or not turned on at all. This characteristic gives the hybrid superior fuel economy. However, the extra motor and batteries as well as a more complex controller add to the cost of producing a hybrid vehicle. The hybrid is an expensive answer to the need for better fuel economy. Moreover, it does not improve efficiency of the millions of fossil fuel burning vehicles on the road.

Another approach, which does not require car or engine redesign, is to have drivers alter their driving styles to try to use the vehicle's engine in a fuel efficient state as much as possible. There are many methods of providing feedback to a driver to indicate or suggest what he or she must do to improve fuel economy.

U.S. Pat. No. 7,512,477 to Quigley et al. discloses an engine management system that takes in the engine's current operating parameters and compares the engine's current operation to a speed-torque map, then generates a display for a driver or some other engine operator. The goal is to guide the operator to use the engine efficiently with the help of the predetermined and stored speed-torque map. Because the speed-torque map, also known as a BSFC diagram, will have different characteristics depending on the engine, the map loaded into Quigley's engine management system (EMS) would have to be specific to the particular engine in the vehicle in order for the driver to hit the efficient region of operation with the EMS. The EMS described by Quigley et al. is capable of directing the driver to use the engine's "sweet spot" but does not necessarily lead to better fuel economy over time, because the driver cannot maintain the engine in the "sweet spot" anywhere near all the time.

Generally, to run the engine in the sweet spot, less fuel is used for each unit of work done, but more fuel is consumed per unit of time than what is generally needed to maintain the vehicle's current speed. In other words, to achieve what would be the greatest fuel efficiency, the vehicle has to accelerate. The consequence of this is that the excess work the engine produces becomes translated into the kinetic energy of the vehicle, which gets higher and higher and results in the vehicle building more and more speed. Quigley et al. provide no way to release this excess energy and let the vehicle return to an appropriate speed unless the throttle is partly released. The moment the throttle is partly released, the engine will no longer be operating in the sweet spot, and the excess energy is partially wasted. Quigley et al. suggest a method of evaluating a driver's performance according to a ratio of distance over which the engine operated in an area of high performance to a predetermined running interval distance, so a score such as fifty percent could be assigned. This evaluation is not equivalent to evaluating fuel economy, because it provides no information on how well or poorly the driver performs while not driving in the sweet spot. Finally, a potential drawback of Quigley et al. is that the driver must pay attention to the display and make the effort to operate the throttle in accordance with the display, which might make driving inconvenient and/or uncomfortable.

In the past, the focus has been to design engines that operate more efficiently under typical driving conditions, or to assist the driver to use engines in the region of the best fuel efficiency. In the case of providing guidance to drivers, however, the present inventors are not aware of any art that has addressed what is to be done after operating the engine in the sweet spot, which generally results in more acceleration than the driver needs or desires.

In order to obtain the best fuel economy over time, the present inventors have determined that it is necessary to take a step back from the engine-centric view, and consider what happens to the vehicle's energy as whole including the excess kinetic energy that the engine produces while operating in an efficient state. This excess kinetic energy must not be allowed to go to waste and must be used to contribute to the distance that the vehicle travels to achieve the best fuel economy. A system or device that is portable and works universally on any automotive vehicle without requiring predetermined information specific to each vehicle or engine is also needed. An automatic and universal system, usable on any vehicle without customization, which is capable of managing not just the engine output, but also the energy of the vehicle as a whole, preferably without inconveniencing the driver, is desired.

SUMMARY OF THE INVENTION

The present invention is a system to efficiently control an engine to help improve vehicles' fuel economy with the principle of using the engine at optimal efficiency nearly one hundred percent of the time. A first aspect of the system is that it finds any engine's most fuel efficient state of operation using real-time parameters, and actively induces the engine to run in its most fuel efficient state. A second aspect of the system is that it helps the driver operate the vehicle in an on and off, pulse width modulation ("PWM") style in order to keep the engine working in the most efficient state. Finally, a third aspect of the system is that it is convenient for drivers to use in that preferably it handles the throttle in an on-and-off modulating style so the driver need not worry about operating the vehicle in an on-and-off style. In various embodiments of the invention, one or more of these aspects may be used or combined.

To determine the engine fuel efficiency, there are two quantities involved: the work the engine has done and the amount of fuel consumed to produce the work. Fuel efficiency is generally defined in the automobile industry by how much fuel is consumed to do the same unit of work, called specific fuel consumption. Experts test engines and derive from experiments a BSFC (brake specific fuel consumption) map with variation in engine speed and torque to find the distribution of the specific fuel consumption, which varies significantly from engine to engine. There is generally one region around a particular engine speed and a particular torque where the engine has the highest efficiency; this is where the specific fuel consumption is the lowest, and is also referred to as the sweet spot. In a preferred embodiment, the inventive system directly uses the engine's output power, or engine load, and either the fuel flow or the air flow, (which is proportional to fuel flow), as a new, innovative method to evaluate fuel efficiency instead of using BSFC maps. (A less preferred embodiment of the invention may use the sweet spot as a way to operate in a relatively efficient state, and combine that with the PWM method of operation.)

To maximize the power over fuel flow ratio is to maximize the engine's fuel efficiency. Conversely, minimizing the fuel flow over power ratio also maximizes the engine's fuel efficiency. Herein, the term "power over fuel ratio" or "P/F ratio" refers to the real-time parameter that the system actively maximizes, though it is understood that minimizing the F/P (fuel over power) ratio is equivalent. The P/F ratio is a quantity that changes depending on what vehicle is driven, the current vehicle speed, road conditions, and other factors.

Incrementally increasing or decreasing the throttle incrementally increases or decreases the fuel flow and induces a change in the P/F ratio. Inducing a transmission gear shift also induces a change in the P/F ratio because this alters the amount of power the engine delivers. The P/F ratio is a readily attained dynamic quantity that can be maximized in real-time for any vehicle to maximize the vehicle's fuel economy. Therefore using the P/F ratio is a universal and effective way to increase fuel economy for all vehicles. The system does not need to map out the P/F ratio or any other parameter in advance, because the system tracks the P/F ratio in real-time and manages the engine's operating conditions so as to continually maximize this ratio of work done per unit of fuel. Accordingly, the inventive system achieves the goal of maintaining the engine in its optimal or virtually optimal region of operation.

Once the most efficient state is found, it is difficult to stay in this state for long. Specifically, as noted above, using the engine in this state usually entails using the engine at a significantly higher power than desired, causing the vehicle to accelerate. Eventually the acceleration will take the vehicle speed above the desired speed, and the driver will want or need to stop the acceleration, and will release the accelerator pedal (and sometimes hit the brake too). The system detects the driver's intention from the accelerator pedal's position as well as the brake position. If the driver wishes to stop accelerating, indicated by reduced pressure on the accelerator, the system will automatically initiate a period during which the vehicle glides or coasts.

As the system releases the throttle completely during the glide period, it causes the electronic fuel injectors ("EFI") to temporarily stop feeding fuel to the engine, in effect turning the engine off. This response, of the EFI stopping fuel flow to the engine when the throttle is released and the engine RPM is significantly higher than idle RPM, is an inherent feature of modern engines. Conventional driving styles with the foot continually pressing the accelerator pedal to maintain a constant speed neither use the engine in its most fuel efficient state nor provide a chance for the EFI to stop delivering fuel to the engine.

This system will help save fuel based on two guiding principles. First, during the pulse or acceleration phase, the system helps the driver use the engine as fuel efficiently as possible (such that the P/F ratio is maximized by continually or constantly adjusting fuel flow to maximize the ratio). Second, during the glide or deceleration phase, the throttle is released completely, and the engine uses either minimal fuel (idle) or no fuel at all (EFI preclude fuel flow), when the engine RPM is significantly higher than the idle engine RPM. Releasing the throttle completely allows the vehicle to travel some distance without consuming any more fuel than what is needed to keep the engine running. Optionally, shifting the gear to neutral in the glide period (preferably for gliding periods when the vehicle speed is high and engine drag is very significant) will enable the vehicle to travel an even greater distance while coasting.

In the pulse phase the system makes the engine run in the most efficient state, and in the glide phase the engine consumes minimal to no fuel. The excess kinetic energy built up from the pulse phase is used in the glide phase as the vehicle travels extra distance without use of fuel; thus, the glide phase is also referred to as the "honey period." Together, the use of the most efficient state (determined by the P/F ratio) and the honey period makes it possible for the engine to run as fuel efficiently as possible close to one hundred percent of the time.

Accordingly, this system implements an "on and off" strategy, by either (i) running the engine in the most efficient state, or (ii) turning the engine "off" (the EFI stop injecting fuel to the engine).

This "on and off" or PWM approach, if left to the driver to enact, would probably feel unnatural and cumbersome. Accordingly, in a more preferred embodiment, a third aspect of the invention is used, i.e., letting the system operate the throttle to control the pulse and glide phases automatically, which is an especially significant enhancement to the usability of the system. For the convenience of the driver, the system operates the throttle with a throttle actuator to control the engine's output and to induce the engine into running in its most efficient state.

The accelerator pedal's relative position serves as a signal to the system for the speed the driver desires to drive at, and the system can adjust the durations of the pulse phase and the glide phase to maintain the vehicle running at the speed the pedal position indicates. This method of delivering engine power to control vehicle speed is analogous to using PWM to deliver electrical power. Modulating the length of the pulse phase allows varying amounts of acceleration to be delivered to the vehicle to achieve a large range of vehicle speeds. Should the driver have need for acceleration even faster than what the engine can provide at optimal efficiency, the driver need only push the accelerator pedal beyond a certain point, past which the system surrenders control of the throttle to the driver allowing the driver to accelerate the vehicle as desired. In this way, the system automatically operates the vehicle as fuel efficiently as possible with alternating pulse and glide phases but will not impede the vehicle's performance when the driver demands more performance.

The system provides a new and innovative way of managing the energy that the engine produces. This system saves fuel, and functions universally well on any vehicle. The system does not have need for any pre-stored data regarding the engine's most efficient region since the system can find the most efficient state dynamically regardless of the model of the engine. The system can induce the engine to work in the most fuel efficient state nearly all the time. It is furthermore convenient for drivers to use, as they do not have to alter their driving habits to gain the benefits of improved fuel economy with the system.

Another advantage is that it is easy to integrate this system into any consumer vehicle manufactured after 1996, when OBD-II protocols were made standard. With the possible exception of a brake pedal sensor to sense pedal position, all the hardware and interconnections that the system needs can be found as standard components already on-board most vehicles. Therefore, for most vehicles, adding the system can be as simple as reprogramming the vehicle's electronic control module ("ECM"), since the hardware (such as the sensors and the throttle actuator) and the network infrastructure linking these components together already exist on-board the vehicle.

The system can be installed as a plug-in add-on device, but part of the beauty of the system is that it can also be inexpensively integrated into the vehicle, adding no extra hardware but simply reprogramming the vehicle to make better use of the equipment it already has and thereby improving fuel economy. Test-drive experiments with the prototype have shown that this system can make the vehicle's fuel economy approach (and under some circumstances such as highway speeds even exceed) that of comparable hybrids, but at a much lower cost of upgrade.

BRIEF DESCRIPTION OF THE DRAWINGS

FIGS. 2a, 2b and 2c are graphs which depict vehicle speed as it varies with time and also illustrate how duration of pulse and glide phases will affect vehicle speed;

DESCRIPTION OF THE PREFERRED EMBODIMENT(S)

Figure 1:
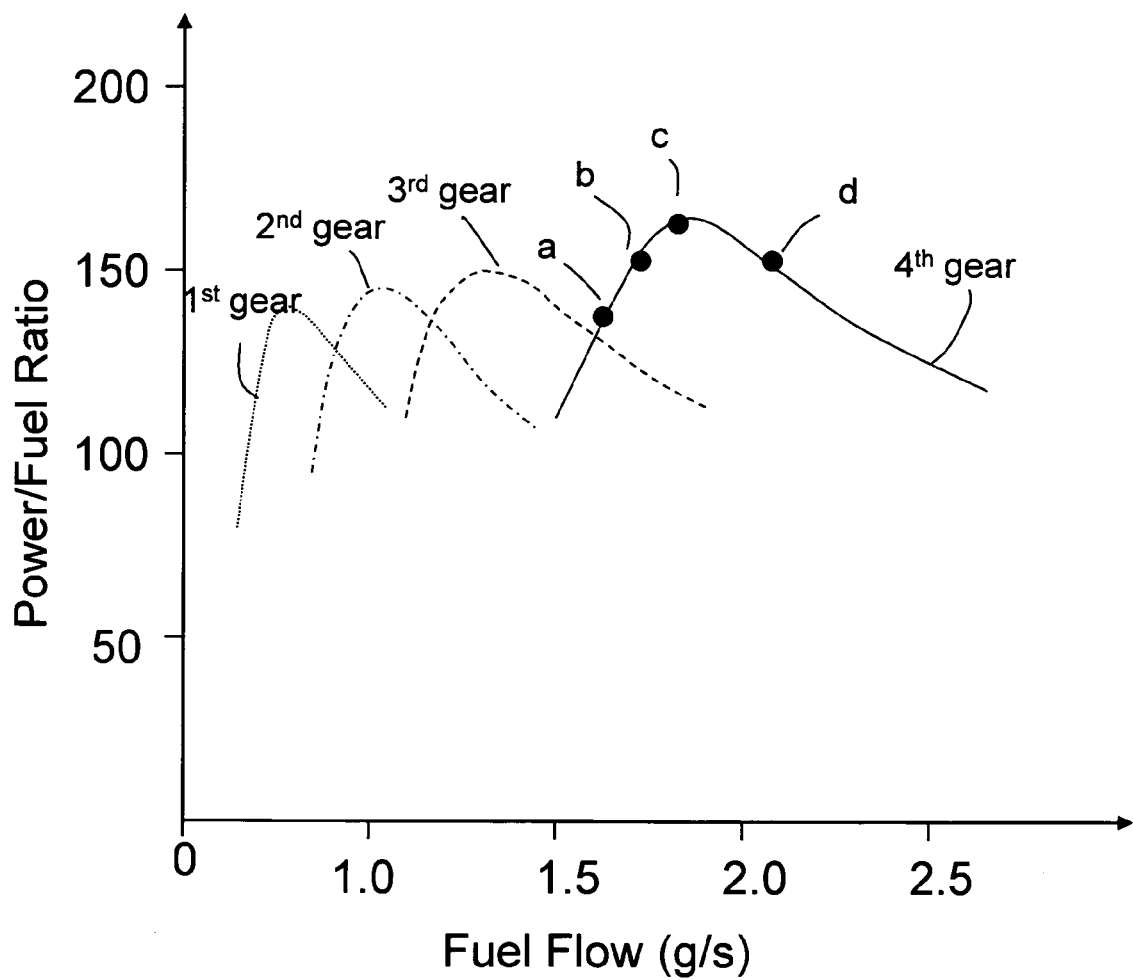
FIG. 1 is a graph of a power over fuel ratio for each gear as it varies with a rate of fuel flow.

Embodiment(s) of the present invention are described herein with reference to the drawings. In the drawings, like reference numerals represent like elements. In a most preferred embodiment, a power to fuel ratio is maximized, as explained below.

Maximizing the Power to Fuel Ratio

A combustion engine converts fuel into power. Generally, the amount of fuel flow to the engine is directly related to how much a driver presses on the accelerator pedal. In other words, the fuel flow rate is linearly proportional to throttle position in typical vehicles (though it need not be).

FIG. 1 shows how a power over fuel ratio ("P/F ratio") plotted against fuel flow. From FIG. 1, it can readily be seen that the P/F ratio varies with the rate of fuel flow. The P/F ratio is a quantity derived from taking the real-time power produced by the engine (or engine load) and dividing it by the real-time rate of fuel flow (or air flow, which is proportional to fuel flow). The P/F ratio represents the engine's power output per unit of fuel. This quantity should be maximized to improve fuel economy, since at the maximum P/F ratio the engine would perform the most work for each unit of fuel it consumes. Conversely, seeking the minimum of the inverse ratio of fuel over power also achieves the same result of improving fuel economy. It should be noted that in place of power or fuel in the ratio, any parameter that is proportional to power and any parameter that is proportional to fuel may be used.

By plotting experimental data of the P/F ratio on the vertical axis against fuel flow (interchangeable with throttle position) on the horizontal axis, it was found that for each gear the P/F ratio is a function of fuel flow (and thus also throttle position). Although the specific values of the peak P/F ratio for each gear differ, for each gear the curve of the P/F ratio is approximately the same shape, with a sharp increase in the ratio as fuel flow reaches a certain point where the ratio is at a maximum, and then a gradual decline as the fuel flow increases past the peak.

For each gear, somewhere on the declining portion past the peak, the current curve will meet the rising portion of the next curve, for the next gear. This point is the gear switching point, and can be used as a control to switch gears. In an automatic transmission vehicle the gear switch occurs automatically, and the system need not change that. In a manual transmission vehicle, the driver determines when the gear shift occurs. The system need not change that either. The vehicle is always on one gear or another, so the P/F ratio is a one-dimensional variable at all times that can be controlled by another one-dimensional variable, throttle position, which is directly proportional to the rate of fuel flow.

The P/F ratio can be represented by the following equation:

$$P/F\ ratio = ((\text{current engine load} - \text{idle engine load}) \times k) / (\text{mass airflow}).$$

The equation above gives the vertical scale for FIG. 1. Preferably, as shown in the equation above, the idle engine load is subtracted because the idle engine load is a constant used to overcome the vehicle's internal friction. The portion of the load of interest is the part of the engine's output that is actually used to accelerate the vehicle, which can be expressed by subtracting the idle engine load from the current engine load.

The P/F ratio becomes more sensitive and more relevant to fuel efficiency after the idle engine load is subtracted. However, in a variation, idle engine load need not be subtracted and the P/F ratio could be taken as P/F=(current engine load× k)/(mass airflow). The P/F ratio could also have the air flow at idle air flow can vary so a minimum idle air flow or an average idle air flow could be subtracted from the air flow. The constant "k" may be one, or may be selected to normalize the P/F ratio, e.g., to make it a number with the significant digits to the left of the decimal, such as k=100.

The system tracks the P/F ratio and controls the throttle position with the throttle actuator to continually search for, change, and seek a higher P/F ratio. Since most vehicles are driven on the highest gear most of the time, the following example of how the system tracks for the maximum P/F ratio will deal with the peak P/F ratio on the highest gear. In this case, the highest gear is fourth gear, as in many automatic transmissions. The analysis is the same for all other gears.

At point "a" in FIG. 1, the system will find that if the throttle is increased incrementally, the P/F ratio also increases. Therefore, the system will increase throttle so that the vehicle operates at point "b", which has a higher P/F ratio compared to "a". From point "b", it can be found that if the throttle is further increased, e.g. to point "c", the vehicle will operate at a still higher P/F ratio than compared to at point "b". Once point "c" is reached, the system will then further increase the throttle to find out whether this can further increase the P/F ratio. Because point "c" is at or near the peak P/F ratio, the system will find that incrementally increasing the throttle, e.g., to point "d", will actually decrease P/F ratio, so the system will decrease the throttle and return the vehicle's state of operation to point "c". The system will find and maintain the maximum P/F ratio during operation so that the vehicle is running at the maximum fuel efficiency.

Even though the exact value of the maximum P/F ratio differs depending on the model of the vehicle and the vehicle speed, and even varies with the incline of the road on which the vehicle is driven, and possibly many other factors, there nevertheless exists some maximum P/F ratio no matter which vehicle is used and no matter what conditions exist. The system does not seek a specific maximum P/F ratio value (which would be subject to change). Instead, the system dynamically seeks the maximum P/F ratio under current conditions by testing how the P/F ratio changes with incremental increases or decreases in fuel flow. The system is dynamic, so it operates the vehicle to maintain the P/F ratio at or near the maximum while it continually tests with incremental changes in fuel flow to make sure that the point of the vehicle's operation still gives the optimum fuel efficiency. Once it is found that an increase or decrease of fuel flow under the current operating conditions gives a higher P/F ratio, there is a new maximum P/F ratio to be found. So, the system will seek out the new maximum using PID methods (proportional-integral-derivative). PID controllers are well-known in engineering and given this disclosure, implementation would be well known to one of ordinary skill in the art.

A suitable sample rate for testing speed and P/F ratio by the control system may vary from a very small fraction of a second, such as a tenth or two tenths, to a quarter, half, three quarter or full second, or longer, depending on responsiveness of the throttle and other aspects of the system, and/or depending on as desired.

Until now, only varying fuel flow has been discussed. Another part of maximizing the P/F ratio may be increasing the load or power, accomplished by gear shifting. An optional improvement is that the system collaborates with the transmission in determining when to switch to a higher gear (increasing the engine load and therefore the P in P/F) and implementing a gear shift, if appropriate, to help run the engine as efficiently as possible. With the ability to switch to a higher gear when conditions allow, it may be possible to operate the vehicle at a higher P/F ratio and increases the inventive system's performance. (See the discussion of FIG. 4 below.)

Dynamically maximizing the real-time P/F ratio is an improved method of maximizing the engine's fuel efficiency compared to the use of BSFC maps. BSFC maps differ significantly from engine to engine. Moreover, there is a certain degree of difficulty involved to construct one, because the BSFC map is constructed from statistics gathered from many cycles of the engine's operation under various speed and torque conditions while the engine is isolated and not connected to any other components. The BSFC map developed for one engine should not be used on another engine as such maps are engine-specific. By contrast, the method of using the P/F ratio to find and induce the engine to work with optimal fuel efficiency can be implemented on any vehicle.

Determining Power Output and Fuel Flow

The power output by an engine is also referred to as engine load. In vehicles, power is typically not determined by any on-board equipment. If it were determined or measured, then one would just use that amount. Typically, the on-board sensors measure RPM (sometimes called "engine speed") and torque (the force times the length of the lever arm on which it is acting, when acting perpendicular to the lever arm). Power is therefore proportional to torque ($\tau$) times RPM:

$$P \text{ is proportional to } \tau \times RPM$$

Fuel flow could also be measured directly, or could be taken as proportional to air flow (air intake to mix with fuel in the engine), because air flow is proportional to fuel flow. Maximizing P/F is therefore the same as maximizing any parameter to which P is proportional for any given fuel flow or any parameter to which F is proportional.

Coasting or Gliding

Simply being able to induce the engine to work at the maximum efficiency, however, is not enough to ensure that the vehicle will run more fuel efficiently. Although ideally it is desired that the engine is run in the most fuel efficient state one hundred percent of the time, in practice it is difficult to maintain the engine running in that state for long. The reason for this is that the engine's most fuel efficient region is located around or approximately at sixty percent of the maximum engine power, and for most vehicles running the engine in this region causes more acceleration than what the driver typically desires or needs. Thus the vehicle will accelerate and reach speeds higher than what is acceptable for the driver, eventually forcing the driver to decelerate (ease up on) or release the throttle, which takes the engine out of the sweet spot, and compromises the vehicle's fuel efficiency until the speed has dropped enough to use the engine in the sweet spot again.

In past methods, there is no way to release the excess energy built up from when the engine is run in the sweet spot. In Quigley et al., for example, it is suggested that a parameter such as the time spent driving in the sweet spot over a predetermined running time interval be used to evaluate fuel efficiency; fifty percent is cited as an example. Prior control methods cannot maintain the engine in the most efficient region for one hundred percent of the time. Prior control methods do not consider how to best release the excess energy built up due to acceleration taking the speed above a desired speed. Therefore, how the driver handles staying at a desired speed, without defeating any efficiency gained by virtue of the time that the engine was operated in the sweet spot, is an important part of increasing fuel efficiency, yet is overlooked.

Because fuel consumption during the time driving outside the engine's maximum efficiency region also has a contribution to the overall fuel economy, it is important that during this period the vehicle be operated fuel efficiently too. Instead of partially releasing the throttle (which is often what a driver does to control speed) and having the engine do work in a fuel inefficient region, the system releases the throttle completely (even if the driver only eases up on the accelerator pedal) to take advantage of an inherent feature of existing vehicles where the ECM will stop the EFI from delivering fuel to the engine when the throttle is completely released and the engine's RPM is significantly higher than idle RPM. This effectively turns the engine "off", as the engine consumes no fuel when these conditions are met. The excess energy put into the vehicle from the pulse phase (FIG. 2a from 0 to t1 and t2 to t3), where the engine operates in its most efficient state, is released through coasting or gliding (FIG. 2a from t1 to t2 and t3 to t4). This glide phase is used to gain distance without consuming fuel.

Optionally, the system can shift the transmission to neutral during the glide period in an automatic and safe way. As the engine's internal friction is one of the largest sources of resistive forces impeding the vehicle's movement, shifting the transmission to neutral and thus removing engine friction (engine "drag") allows the vehicle to glide a much longer distance before the next pulse phase in relation to the distance it would glide while in gear. Gliding on neutral is especially beneficial at higher speeds, as the engine friction increases with vehicle speed. When the system combines control of the pulse period where the engine works at its optimal efficiency with the glide period (where the engine consumes minimal to no fuel to travel extra distance with the excess energy the engine produces in the pulse period), very high or the highest fuel efficiency may be achieved with this strategy of managing the vehicle's energy.

The inventive system uses an energy management system which contrasts with that of hybrids. In a hybrid, when the engine is being used to propel the vehicle, the engine works in an efficient state. The hybrid can convert any excess mechanical energy that the engine produces while operating in an efficient state to electrical energy and then store the electrical energy as chemical energy in the batteries. When the engine is off, the motor takes over and uses the electricity generated from when the engine was on.

In such a hybrid there is a two-way conversion loss (from storing engine power into the batteries and from the batteries supplying energy to the motor). By contrast, the inventive system stores excess energy that the engine produces as the kinetic energy of the vehicle, and releases the excess energy through gliding, so there is no conversion loss. The inventive system thus can outperform comparable hybrids especially at highway speeds. Although both the inventive system and the hybrid system operate the engine most efficiently when the engine is on, when the engine is off the hybrid uses electric power, and some energy is lost through conversion. In the inventive system there is no conversion, and all the excess energy is stored and released directly as the vehicle's kinetic motion. Since the system either induces the engine to work in the most fuel efficient state or turns the engine "off", the engine is working at optimal efficiency essentially or substantially one hundred percent of the time.

As discussed above, a first aspect of this system is that it is able to dynamically find in real-time the engine's most efficient state (using the P/F ratio), and a second aspect of this system is that it runs the engine in an "on and off" style to ensure that the engine runs in its most efficient state whenever it is working (coasting or gliding in neutral and/or drive). Together, these two aspects save substantial fuel. A third aspect of the inventive system involves achieving a very comfortable and convenient operation through controlling the switching between the pulse and glide modes, as explained below.

Using Modulation of Pulse Versus Glide or Speed Bandwidths

Figure 2C:
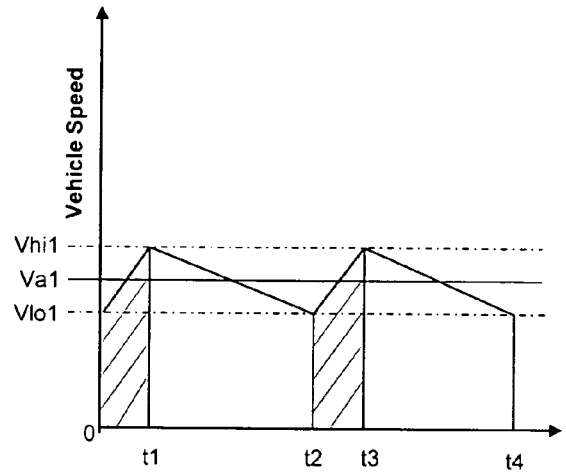

FIGS. 2a-2c illustrate how the system operates the throttle in an "on and off" manner, as well as how the vehicle speed will fluctuate according to the lengths of time spent in the pulse and glide phases. Since the goal of the system is to save fuel, the engine power is fixed in the most fuel efficient state. In order to control vehicle speed, the system can either use speed bandwidths to restrict the vehicle speed within a narrow margin centered around the desired speed, or use modulation of how long the vehicle is run in the pulse period and how long the vehicle glides to achieve this effect.

In FIG. 2a, the system operates the vehicle in the pulse phase with the engine operating at optimum efficiency from time 0 to t1. After the vehicle speed reaches a predetermined upper speed limit $V_{hi1}$, the system releases the throttle completely from t1 to t2 and glides until the vehicle speed falls to a predetermined lower speed limit $V_{lo1}$ before the system starts the next pulse (from t2 to t3) and glide (from t3 to t4) cycle. $V_{a1}$ denotes the vehicle speed that each pulse and glide cycle averages out to. In this example, the duration of the pulse period compared to the duration of the glide period is about 1:3, which means that it takes about three times the amount of time for the vehicle to glide back down from Vhi1 to Vlo1 as it does to accelerate up to $V_{hi1}$ from $V_{lo1}$. However, this ratio is an example only, and is not a requirement.

At low speeds, engine friction and wind drag are significantly lower than at higher speeds, enabling the vehicle to reach the acceleration desired very quickly because resistive forces are lower. Also at low speeds the vehicle will glide for a longer time over the same relative speed drop due to less resistance. Therefore, the pulse period is short compared to the glide period. Now consider FIG. 2b, where the ratio of t5-0 to t6-t5 is about 1:1. (This ratio is an example only and is not a requirement.) The fact that the vehicle decelerates from $V_{hi2}$ to $V_{lo2}$ in the glide phase at the same rate that the engine can accelerate the vehicle at optimal efficiency from $V_{lo2}$ to $V_{hi2}$ indicates that the vehicle is driven at a higher average speed $V_{a2}$ relative to $V_{a1}$. Wind drag and engine friction increase at higher speeds, so more time is needed to accelerate the vehicle, and the vehicle cannot glide as long a time before acceleration is needed again from the next pulse phase, resulting in an increase of the pulse time to glide time ratio.

The ratio of the time the vehicle spends in the pulse phase to the time the vehicle spends in the glide phase will be referred to herein as the Pulse to Glide ratio, or P/G ratio (not to be confused with the P/F ratio which represents fuel efficiency). If the P/G ratio is held constant, even if the initial vehicle speed prior to maintaining the P/G ratio is higher or lower than the $V_a$ that can be maintained with this P/G ratio, eventually the vehicle speed will equilibrate to the $V_a$ that the constant P/G ratio maintains. Lower P/G ratios are correlated with lower vehicle speeds, and higher P/G ratios are correlated with higher vehicle speeds, due to the fact that the higher the speed, the greater the resistive forces (like engine friction and wind drag) become. Alternatively, the system can also work with the quantity P/(P+G), which will be herein referred to as the modulation ratio. When the resistive forces are greater, it takes longer to accelerate the vehicle in the pulse phase and the speed of the vehicle drops quicker in the glide phase.

FIG. 2c illustrates the concept of even further modulating the use of the engine to achieve a full range of vehicle speeds, representing a more extended period of driving time. Striped areas indicate pulse periods i.e., active acceleration with the engine operating at optimal efficiency. Unmarked areas indicate periods of gliding, when the engine is consuming minimal to no fuel and the excess kinetic energy produced in the pulse phase is used to gain distance.

In region R1, a low speed is maintained, and the modulation ratio is low. When the driver wishes to drive at a higher speed, acceleration is used (region R2) and the entire time accelerating from the lower speed to the higher speed is spent in the pulse period. When the higher desired speed is attained, the vehicle reverts back to pulse and glide cycles in region R3, maintaining the high speed with a higher modulation ratio. To drop to a lower speed, the vehicle decelerates or glides for a time in region R4, until the lower desired speed is attained. The speed of the vehicle in region R5 is higher than the speed in region R1 but lower than the speed in region R3. The modulation ratio of region R5 is also lower than the modulation ratio of region R3 but higher than the modulation ratio of region R1. In contrast to the modulation ratio, the P/G ratio is the bandwidth of the PWM. The modulation ratio is more analogous to a duty cycle which can be applied to control vehicle speed.

Using the engine in a PWM approach as described above enables the engine to be run in the most fuel efficient state without accelerating the vehicle to higher than desired speeds. To control vehicle speed, there are many methods, but there are two major directions for whatever approach is used. Either an active approach or a passive approach could be implemented. An active approach would directly set and vary the durations of the pulse period and glide period to achieve speed changes. A passive approach would involve using speed margins ($V_{hi}$; and $V_{lo}$ in FIGS. 2a and 2b) to control the speed, which naturally results in corresponding changes to the durations of the pulse and glide periods and therefore changes in the modulation ratio, which is passively altered. Either active or passive approaches to modulating engine power could work, although the passive method is preferred because it is a simpler way to control vehicle speed.

For example, the system could be controlled so that the P/G ratio is X below a threshold speed $V_t$ and is Y above the threshold speed $V_t$. If P/(P+G) is used for the modulation, then P/(P+G) could be X' below $V_t$ and Y' above $V_t$. So, when the desired speed (or plus a predetermined margin) is reached as determined by the accelerator pedal position, the system then controls modulation by accelerating for a period of time to get to the upper speed band, then glides for 1/x times the length of time the system accelerated after reaching the desired speed, if the speed is below Vt (or Y if above Vt), or G=(P−PX')/X' if the speed is below $V_t$ or G=(P−PY')/Y' if speed is above $V_t$, where G and P are the time in the pulse phase and the time in the glide phase, respectively, once the desired speed has been reached.

Throttle and Acceleration

Figure 3:
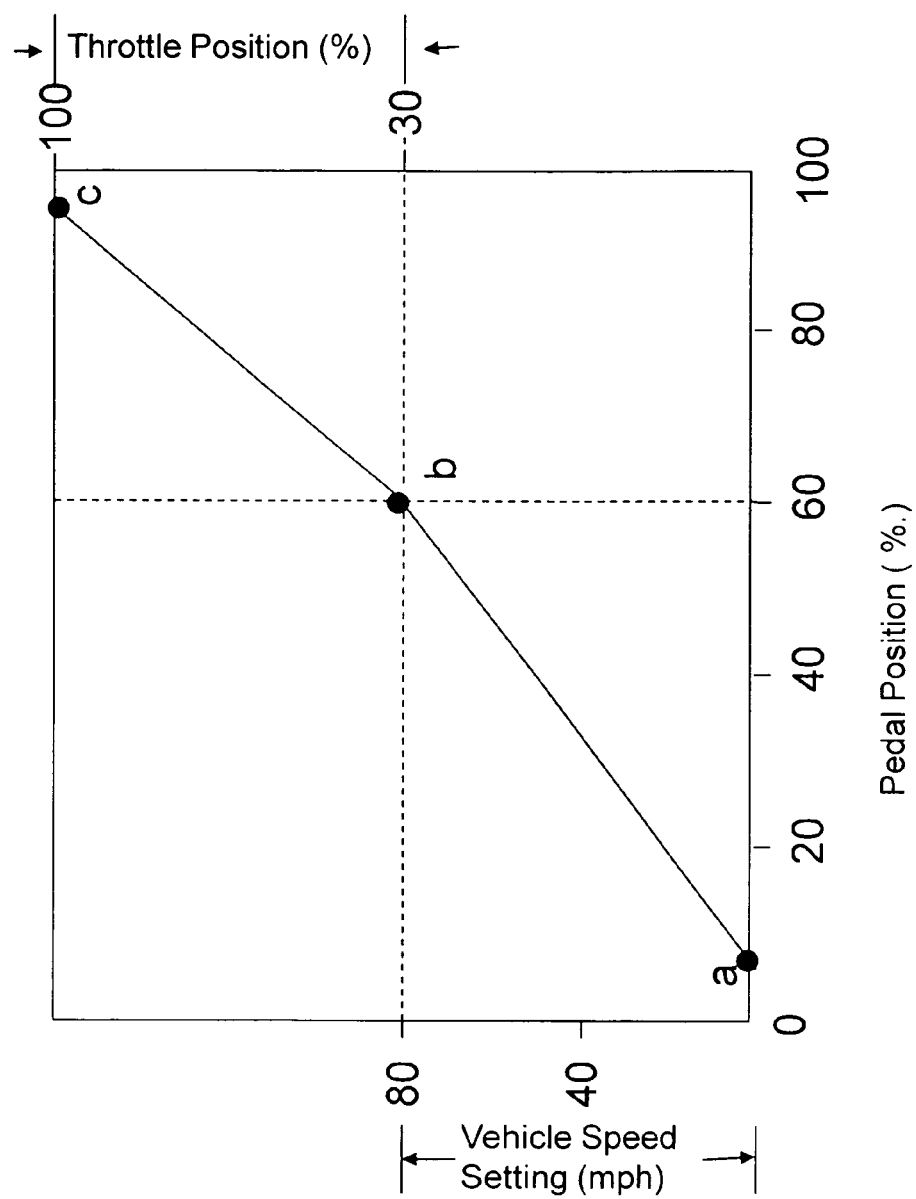
FIG. 3 is a graph for illustrating translation of accelerator pedal position into a control for a throttle actuator to push the throttle in a modulating manner (based on vehicle speed) so as to manage engine output.

FIG. 3 presents a simple scheme of how the system can use the accelerator pedal position to determine exactly how to operate the throttle. The system senses the accelerator pedal position from being fully released, zero percent, to being completely pushed down, one hundred percent, and the whole range of pedal positions in between. From some point "a" to some point "b", the accelerator pedal position will determine the average vehicle speed for the system to maintain the vehicle at using the method illustrated in FIGS. 2a, 2b and 2c. From some point "b" to some point "c" in the accelerator pedal position, the system will surrender throttle control to the driver entirely. Accordingly, when high bursts of acceleration exceeding what the engine can output at maximum efficiency are needed or desired by the driver, the vehicle's performance may be considered more important than fuel efficiency. Performance could be sacrificed for vehicle efficiency in this situation too, but safety (e.g., accelerating to get onto a freeway or highway) dictates elevating performance over fuel efficiency when the driver demands or requests performance by a predetermined minimum accelerator position.

As a theoretical example, assume that point "b" occurs at sixty percent of the maximum pedal position, and is set to regulate the desired vehicle speed to 80 mph. This means that if the driver pushes the pedal to point "b", the system will accelerate the vehicle until a speed of 80 mph is reached without using any gliding. The system will operate the engine at optimal efficiency during the acceleration until the vehicle speed exceeds 80 mph by a margin that the driver sets (e.g., the speed bandwidth discussed above in the preferred embodiment).

When the driver desires to drive at a lower average speed than 80 mph, the driver should then release the accelerator pedal a sufficient amount until the vehicle returns to a lower average speed to maintain. Should the driver wish to maintain an average speed around 40 mph, for example, he or she should release the pedal position to around thirty three percent of the maximum position. In this situation, there is no need for the driver to release the throttle completely because the system will handle gliding, and no need to press the accelerator again to maintain the speed, because the system handles the entire process. The significance of the accelerator pedal position here is to indicate to the system what average speed the driver wishes to maintain.

The system automates alternatively using the engine at its most efficient and switching the engine "off" for gliding to maintain any average speed that the accelerator pedal position indicates. When the accelerator pedal is held at a certain position by the driver, the pedal position sensor (on-board or added) signals to the system controller what speed $V_a$ (see FIGS. 2a to 2c) to maintain the vehicle around and the system does so. The system has feedback from the OBD-II interface, which accesses the vehicle speed sensor, so the system can determine when to release the throttle completely. The system determines when the current vehicle speed is at a certain margin above $V_a$ at $V_{hi}$, and when to operate the engine again at its optimal efficiency (at a certain margin below $V_a$ at $V_{lo}$).

Preferred speed margins are preferably proportional to current speed for comfort, e.g., five percent plus one mph (5% speed+1 mph) for comfort. Margins for speed could also be constant, for instance 5 mph below and 5 mph above, providing a 10 mph bandwidth from $V_{lo1}$ to $V_{hi1}$, but other amounts or bandwidths may be used. Bandwidths of 2 mph or 4 mph (±1 mph or ±2 mph) may be reasonable depending on circumstances, e.g., for a lot of stop and go or local driving, while 8 mph (±4 mph) or 10 mph (±5 mph) might be more suitable at high speed and/or freeway use. Therefore, it is possible to have a variable setting, which is user adjustable, and/or built-in varying setting, such as (±3 mph) up to 40 mph and ±5 mph above 40 mph. Also, it is possible to vary a different amount above the user's desired speed (indicated by the accelerator position) than the amount below the desired speed, and to use the user's desired speed as a maximum or as a minimum. Alternatively, the system may also use the pedal position to determine the P/G ratio or the modulation ratio that the system can use to equilibrate the vehicle speed as opposed to using speed margins or bandwidths.

Figure 3A:
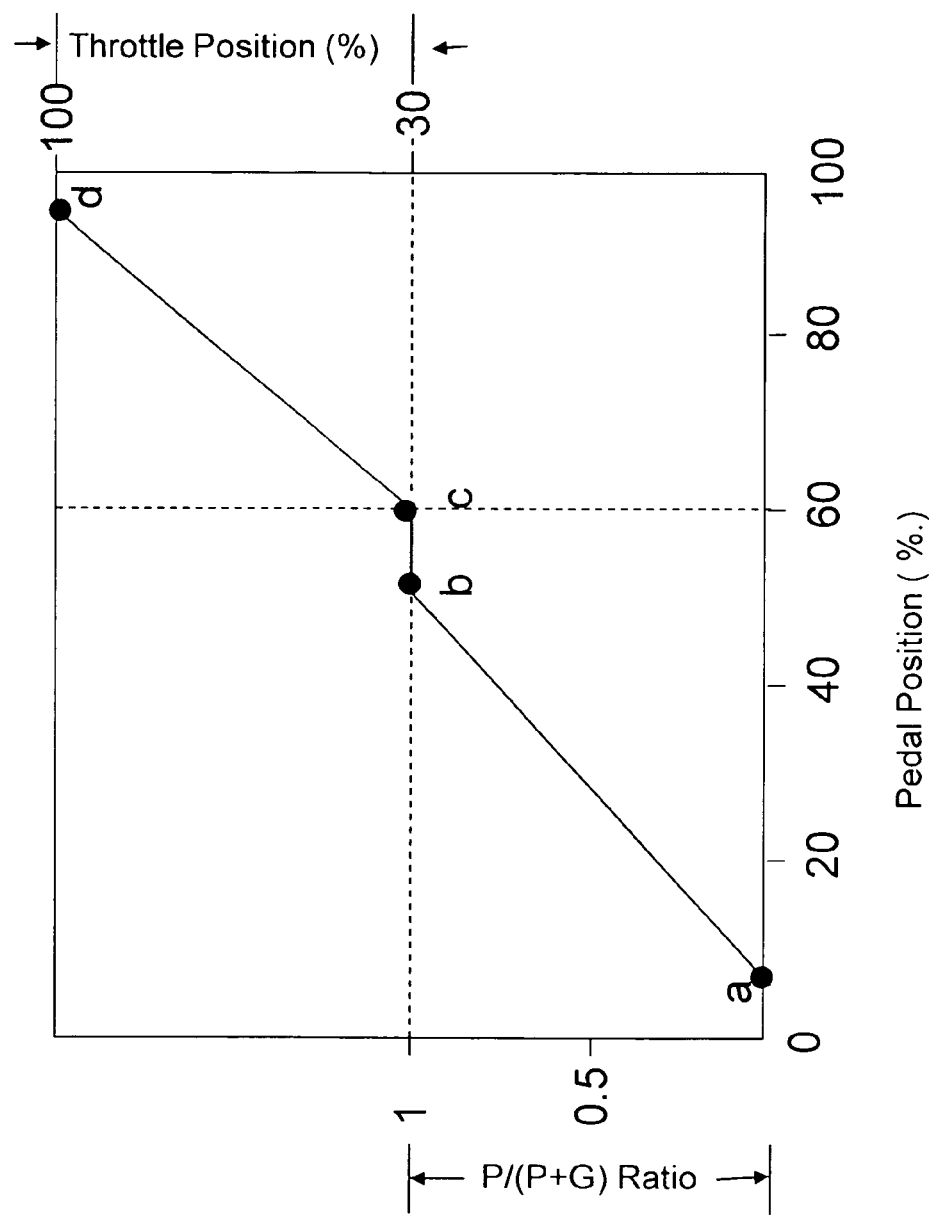
FIG. 3a is a graph for explaining a concept of modulation of the pulse and glide phases by use of a ratio (P/(P+G)) and how the ratio varies with throttle (pedal) position.

The implementation described above refers to the passive and preferred mode for modulating engine power. Alternatively, one may also use the accelerator pedal position to implement an active method for modulating engine power, as shown in FIG. 3(a). With this scheme, the pedal position directly determines a P/(P+G) modulation ratio to control the engine at. Around twenty five percent pedal position, for example, the modulation ratio determined would be 0.5, meaning that half the modulation period would be spent using the engine in the most efficient state, and half of the modulation period is spent with the vehicle coasting. This modulation ratio would equilibrate naturally at some speed, depending on the engine and the vehicle. If the equilibrium speed reached is too high, the driver need only release the accelerator pedal a little, which determines a lower modulation ratio, which in turn results in a lower equilibrium speed. Conversely, if the equilibrium speed reached with a 0.5 modulation ratio is too low, then the driver should press the accelerator pedal a little more, resulting in a higher modulation ratio, which then will equilibrate a higher speed.

With this alternative implementation, point a in FIG. 3(a) would represent a 0 modulation ratio (i.e. no use of the engine at all). From point a to point b the modulation ratio varies from 0 to 1, with the modulation ratio 1 at point b representing use of the engine in its most efficient state throughout the modulation period (i.e. the entire time). The modulation ratio is 1 from point b to point c so that the driver can more realistically and comfortably maintain the engine running in the most efficient state full time if the driver desires. In the range of pedal position between b and c, there is no more modulation because the engine is being worked for the entire time without coasting, but the system maintains the engine running in the most efficient state possible. Past the pedal position at point c, the driver will then be able to control throttle directly without the interference of the system at all, all the way to point d, the maximum pedal position allowable on the vehicle.

For both the schemes described in FIG. 3 and FIG. 3a, from point c to point d the system surrenders control of the throttle to the driver, and so it cannot be guaranteed that the engine is working at optimal efficiency. This range of pedal positions gives the driver full control of the throttle and should be used when the engine cannot provide the acceleration desired when it is working at optimal efficiency, when there is an emergency, or when the driver is not concerned with fuel efficiency and wishes for more direct control over vehicle acceleration.

Optionally, the system could implement techniques to smooth out abrupt acceleration so that passengers have a more comfortable experience. For example, any acceleration (from using the engine) or deceleration (from releasing the throttle for the transition from pulse to glide phase) initiated by the system could be implemented in incremental steps, with the speed change in each step limited. Therefore, it may take slightly longer to reach the optimal P/F ratio, but it is eventually reached, without the driver feeling any "jerk" or uncomfortable sensation throughout the process if there would otherwise be too many quick changes from pulse to glide and/or glide to pulse.

Also, instead of controlling the vehicle's speed with the pedal, the driver may set the speed for a fuel efficient cruise mode with the inventive system. The difference between this cruise mode and conventional cruise methods that may already exist onboard the vehicle is that the goal of traditional cruise control is to fix the vehicle's speed as specified by the driver, with no explicit intentions to save fuel, while the cruise mode that the inventive system implements has fuel efficiency in mind while maintaining the vehicle within a certain range of speeds close to the speed specified by the driver. The inventive system implements this special cruise mode with an "on and off" method; whenever accelerating the system maintains the engine running optimally, i.e. highest P/F ratio, and when gliding the vehicle is using no fuel or minimal fuel. The cruise mode may be disabled by a button or whenever the driver pushes the brake pedal. The driver does not need to operate the throttle in an "on and off" manner. Since the system implements the details of throttle operation, the driver does not need to alter any of his or her usual driving habits.

System Diagram

Figure 4:
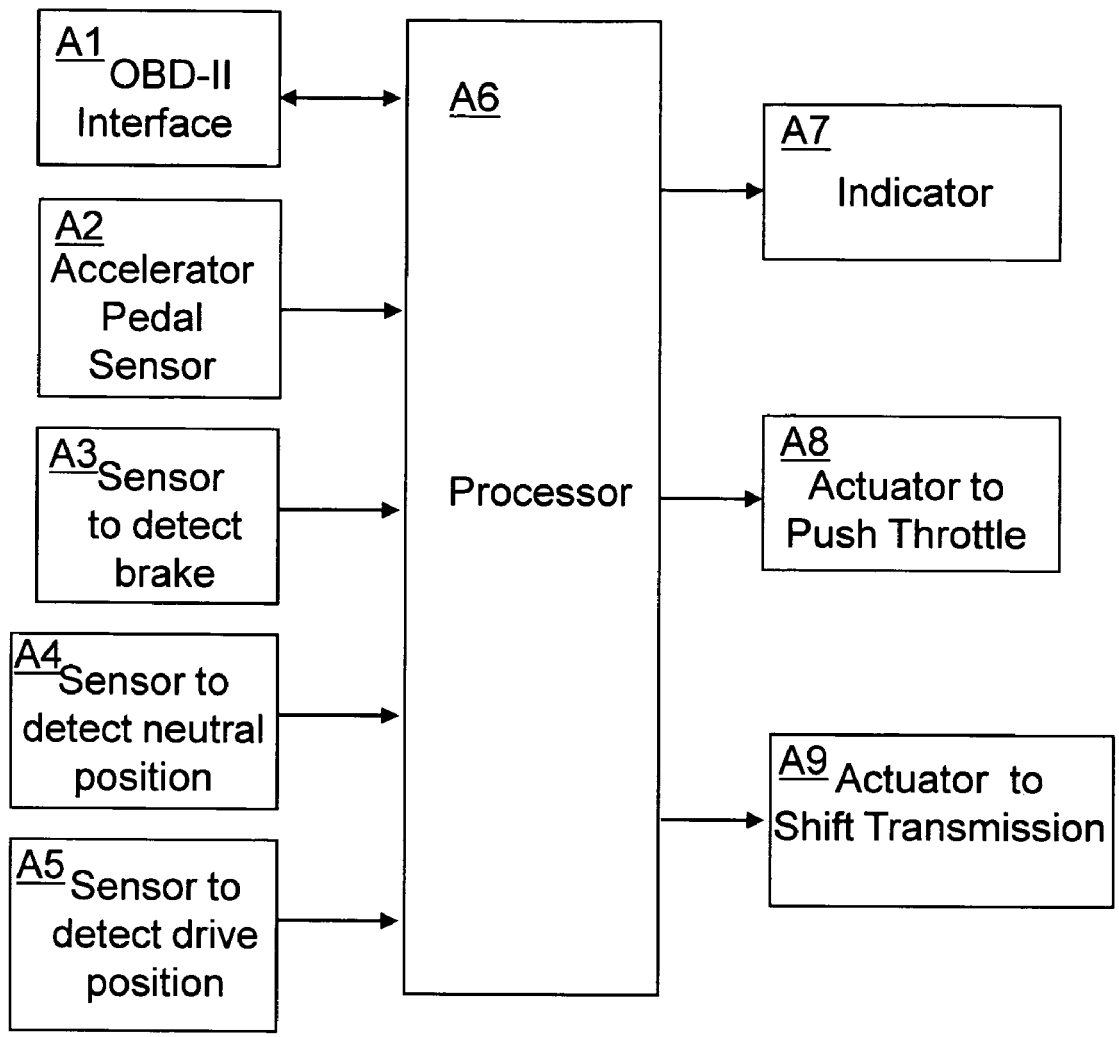
FIG. 4 is a schematic diagram of components of a complete system in accordance with a preferred embodiment of the invention.

FIG. 4 shows the components of the complete system. Inputs are fed to a processor A6 for the system. All system processing may take place in processor A6. However, it may also be beneficial to split up processing among various components, by including sub-processors as part of various sensors and/or actuators and/or indicators. Also as noted elsewhere herein, the processor A6 may actually be incorporated inside a vehicle's ECM.

There is an OBD-II interface A1 to acquire vehicle data, an accelerator pedal sensor A2 to indicate the acceleration the driver desires such that processor A6 will operate throttle actuator A8 automatically to control the throttle, a sensor A3 to indicate the position of the vehicle's brake pedal, a sensor A4 that indicates whether the transmission is on neutral, and a sensor A5 that indicates whether the vehicle's transmission is on drive. Sensors A1 to A5 already may be part of the vehicle, or to the extent not part of the vehicle, they may be installed in an add-on embodiment. The processor A6 receives inputs from sensors A2 to A5 and from the OBD-II interface, evaluates the vehicle's real time fuel efficiency, and produces outputs to indicator A7 and throttle actuator A8, and transmission shift actuator A9 to maximize the vehicle's fuel efficiency at the vehicle's given speed and other given parameters. The purpose of indicator A7 is to provide feedback to the driver, as well as provide an interface for the driver to input settings for the system (i.e. special system functions such as a fuel efficient cruise mode with lower and upper speed limits).

The system has throttle actuator A8 to automatically and precisely control the throttle and transmission actuator A9 (optional) that handles automatically switching the transmission from drive to neutral when gliding and switching the transmission from neutral to drive when either accelerating or braking. In one embodiment, processor A6 receives inputs from the OBD-II interface A1 and accelerator pedal sensor A2 and has one output to the throttle actuator A8. In a further embodiment, processor A6 receives inputs from the OBD-II interface A1, accelerator pedal sensor A2 and brake sensor A3 and has one output for throttle actuator A8 that controls the vehicle's throttle. In another embodiment, processor A6 receives inputs from sensors or units from the OBD-II interface A1, brake sensor A3, neutral position sensor A4, and drive position sensor A5 and has one output for transmission actuator A9. Each of the aforementioned embodiments can be supplemented with another output to indicator A7.

In a most complete embodiment with all the options, processor A6 receives all the inputs from the OBD-II interface A1, accelerator pedal sensor A2, brake sensor A3, neutral position sensor A4, and drive position sensor A5 and has three outputs, one of which is for throttle actuator A8 that helps to control the throttle, another for transmission actuator A9 to shift the vehicle's transmission, and a third to indicator A7 that provides feedback and communication to the driver.

Throttle actuator A8 may be the throttle actuator for cruise control already existing within the vehicle. Servos or step motors may act as throttle actuator A8 and transmission actuator A9, but other methods of performing these tasks are not precluded. Embodiments with throttle actuator A8 may implement the fuel efficient cruise mode and the automated speed based modulation driving.

In the optional embodiment where the processor A6 also determines when to shift gears (between and among first, second, third, fourth and/or overdrive and/or other gears if such exist), the diagram of FIG. 4 is the same. In this case, the processor in maximizing power determines whether or not a gear change will maximize power, and if so, then effects a gear change along the path to the transmission actuator A9.

Processor Control

Figure 5:
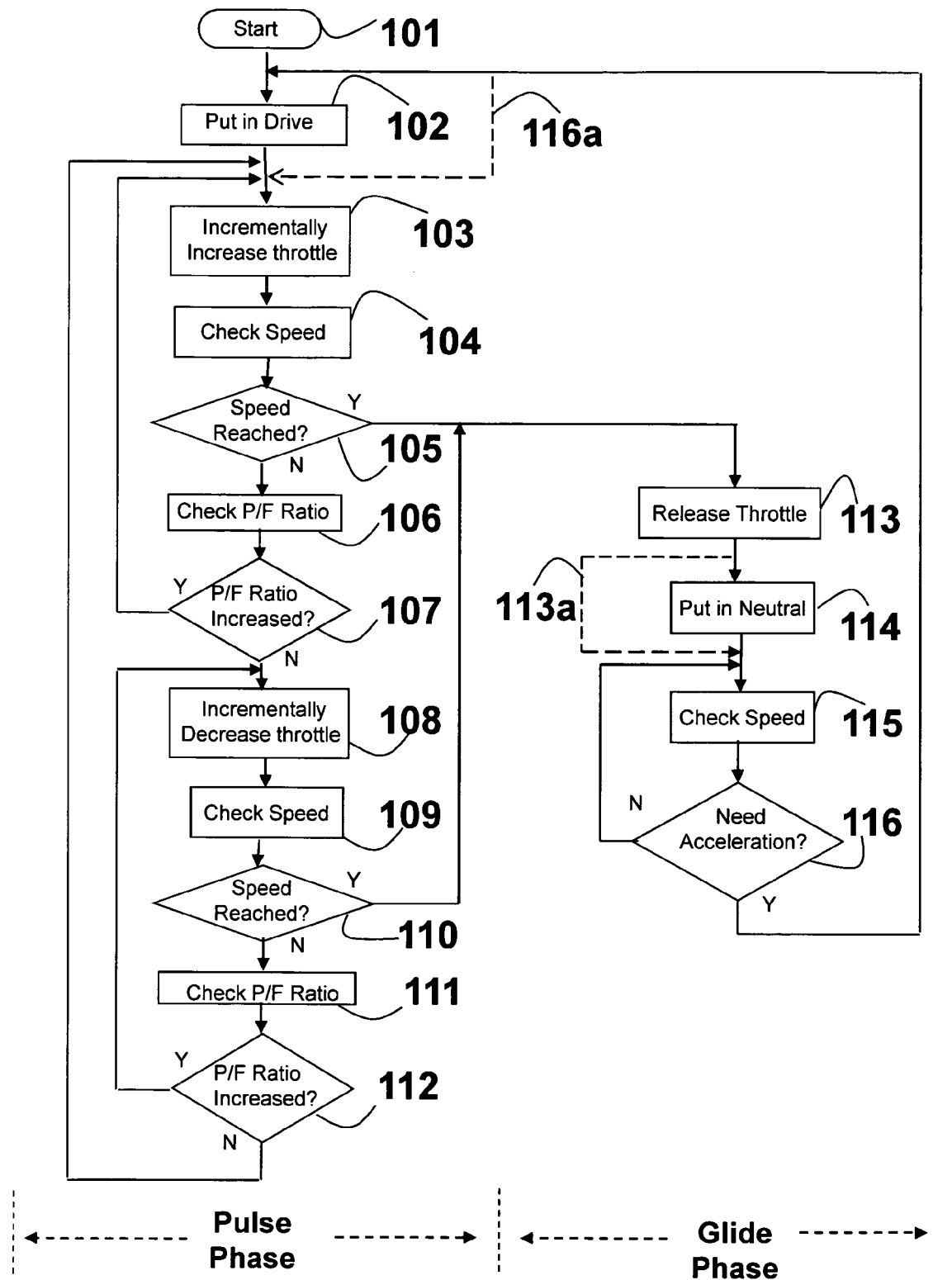
FIG. 5 is a logic flow chart of how the system operates the throttle to drive the vehicle so as to increase fuel efficiency.

FIG. 5 is a flow chart of how a vehicle will be driven ideally with pulse and glide style modulation. Steps 102-112 are directed to the pulse phase, and steps 113, 113a, 114, 115, 116 and 116a are directed to the glide phase.

First, the engine of the vehicle must be started at step 101 by turning the vehicle on. Next, since the vehicle has just been started, the transmission must be put in drive at step 102. Any time spent in reverse or parking is considered part of or the same as step 101. In other words, the control system applies to driving forward, not while in reverse or park. After the transmission is put in drive, the driver normally presses the throttle and acceleration of the vehicle follows by the system checking the accelerator pedal position and increasing the throttle at step 103. As the vehicle accelerates, the system monitors the vehicle speed at step 104 by communicating with the vehicle's computer using the OBD-II interface.

If the desired speed (either pre-set by the driver through the system's cruise function or determined by the current accelerator pedal position) has been reached at step 105, then the system starts putting the vehicle into the glide phase by releasing the throttle at step 113. It is unlikely that immediately following starting up the vehicle at step 101 the speed condition at step 105 has been fulfilled, so the pathway directly from step 105 to step 113 is mainly intended for or will mainly arise after there have been at least some or many incremental increases to the throttle by the system at step 103 and/or decreases at step 108, and when the vehicle needs to have the throttle released at step 113 to glide.

After step 105, the system calculates the current P/F ratio at step 106 from the applicable sensors and/or OBD-II inputs as discussed above, then evaluates whether the P/F ratio has increased at step 107 since the last change in the throttle's position. Immediately after starting the vehicle at step 101, the default previous P/F ratio will be set to zero. Then, following each incremental change to throttle position, the last computed P/F ratio is stored as the previous P/F ratio before the processor proceeds to compute the new P/F ratio at step 106 following any change in the throttle's position (e.g., throttle changes that occur at steps 103 or 108).

In any case, if upon comparison (at step 107) the P/F ratio has increased, the system attempts to see if the P/F ratio can be increased further by taking another incremental step in increasing the throttle at step 103. Otherwise, if upon comparison the P/F ratio has not increased at step 107, then the system will test and see if the P/F ratio can be increased by decreasing the throttle at step 108.

Following an incremental decrease to the throttle at step 108, the system will also check the vehicle speed at step 109. Then, at step 110, the system will decide whether the desired speed or the upper speed limit for the fuel efficient cruise mode has been reached. If this speed has been reached, the system initiates the glide phase beginning with release of the throttle at step 113. Otherwise, the system proceeds to check the current P/F ratio at step 111 and at step 112 the system compares the P/F ratio with the previous P/F ratio to determine whether there has been an increase in P/F ratio. If the P/F ratio has increased as a result of a decrease in throttle (that occurred at step 108), then the system returns to step 108 (from step 112) and attempts to further increase the P/F ratio by decreasing the throttle.

If the P/F ratio has not increased at step 112, then the system returns to step 103 and tries instead to increase the P/F ratio by increasing throttle at step 103. At either step 105 or step 110, once the desired speed has been reached, the throttle is released at step 113, and the vehicle enters the glide phase.

If the transmission actuator is installed and its corresponding option is enabled, after the throttle is released at step 113, the system will use the transmission actuator A9 to put the transmission into neutral position at step 114; otherwise, no action is taken until the next step (path 113a). The device will then continue monitoring the vehicle speed at step 115, and if more acceleration is needed as determined at step 116, then the system returns to step 102, putting the transmission back into drive for the re-initiation of the pulse phase by increasing the throttle at step 103.

This cycle continues over and over. If there is no neutral step 114, then at step 116 when the system determines that acceleration is needed, path 116a is followed directly to step 103.

For the entire time, the driver is the one who exercises discretion using the accelerator and the brake pedals. The system detects how the driver uses these pedals, and will respond accordingly to operate the vehicle in a fuel efficient yet safe manner. The driver also need not worry at all about shifting the transmission for gliding, since the inventive system preferably will either completely automate this function in a safe manner with the relevant actuator, or not implement transmission shifting at all. The system takes over all of the decisions and actions in FIG. 5, and operates the throttle actuator from the readings from the accelerator pedal, which the driver is in control of. How deep the accelerator pedal is pressed determines the vehicle speed that the system will maintain.

It should be noted that pressing the brake causes the system to release throttle if in the pulse phase (or stop gliding if in the glide phase), and the system re-enters the pulse phase when the driver takes releases the brake and hits the accelerator pedal or re-enters the glide phase when the driver releases the brake but does not hit the accelerator pedal. (See FIG. 6 described below.)

Figure 2C:
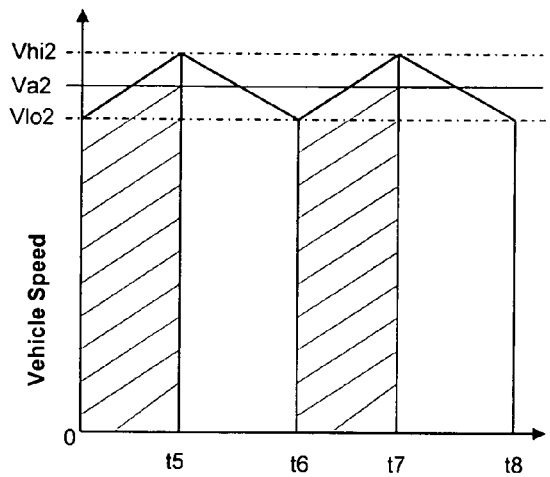
Figure 2C:
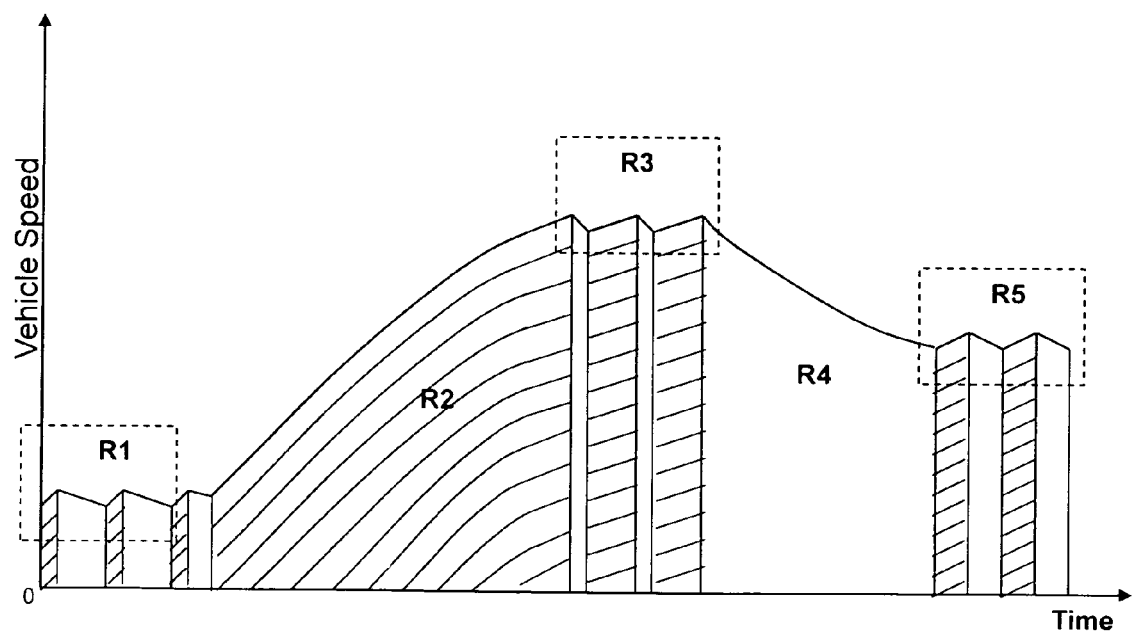

If using the fuel efficient cruise mode that the system features, the driver can set the desired median speed ($V_a$ in FIG. 2) as well as the range of speeds allowable from the highest speed allowable $V_{hi}$ at the start of the glide to the lowest speed allowable at the end of the glide $V_{lo}$, at which point the device will start the next pulse phase to accelerate to the desired speed. The special cruise mode unique to a preferred embodiment of this invention can be deactivated by pressing the brake or a switch that deactivates automated cruise mode. While the driver operates the vehicle the same as always, the system implements the details of managing the throttle and engine output to achieve optimal fuel efficiency with no inconvenience whatsoever to the driver.

Transmission Actuator Option to Shift to Neutral and Back

Figure 6:
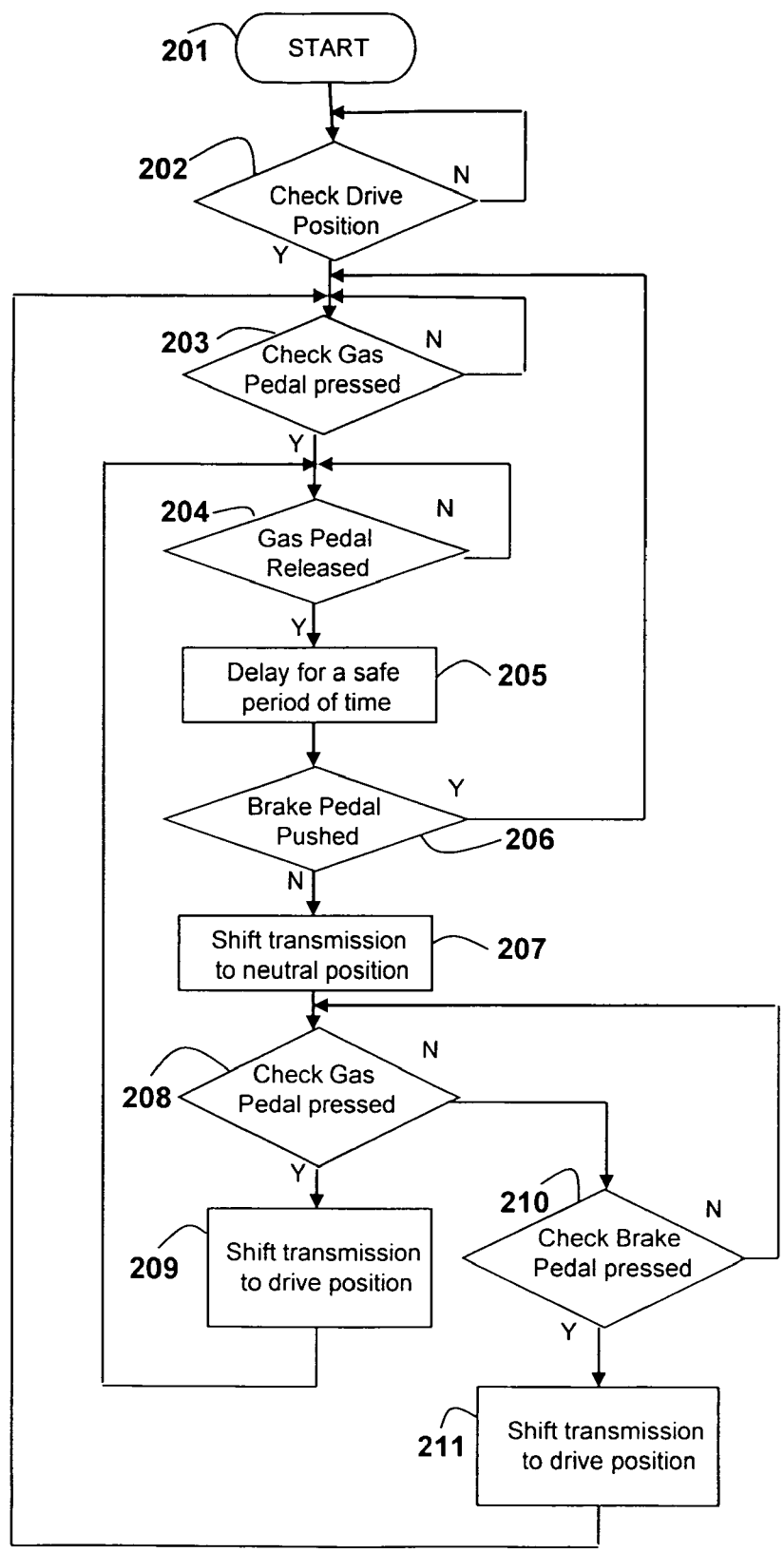
FIG. 6 is a logic flow chart of how the system handles operation of an optional transmission actuator according to a driver's need, safely and effectively.

FIG. 6 is a flow chart of the overall logic the system implements to control the transmission actuator, if used. It is assumed that all throttle operation is done by the throttle actuator the system uses. After the vehicle is started at step 201, the system will check for the transmission to be put into the drive position at step 202. The system will not proceed to the next step or affect anything if, for example, the transmission is in reverse or in park.

After the system detects that the throttle was pressed (step 203), the system will wait for the throttle to be completely released (step 204). The time from when the throttle is pushed to the time when the throttle is released marks the duration of the pulse phase. If the throttle is completely released (step 204), then logically the system encounters one of two intentions: to glide or to brake. To make sure that the driver intends to glide (by completely releasing the accelerator pedal and thus directly causing the system to release the throttle completely), the system implements an optimal delay (step 205) to account for the driver's reaction time, and checks to see immediately whether during the delay (step 205) the driver has pressed the brake pedal (step 206). If the brake pedal has been pressed (step 206), the system returns to step 203 to wait for the next pulse phase, which begins when the throttle is pressed again (step 203).

After the throttle is released (either by the volition of the driver in releasing the accelerator pedal or because the system needs to glide to return to the desired speed) at step 204, if the delay at step 205 has passed and the brake pedal was not pushed (step 206), the processor signals the corresponding actuator to shift the transmission to neutral (step 207); the vehicle then enters glide phase. The system will continue checking whether the throttle has been pressed again (step 208). Once the throttle has been pressed (step 208), this signifies the start of another pulse phase, and the system signals the transmission actuator to shift the transmission to drive (step 209), and wait to release the throttle (step 204). If the throttle was not pressed when the system checks (step 208), then the system will check to see whether the brake has been pressed (step 210) by using the brake sensor input. If the brake has been pressed (step 210), the processor signals the actuator to shift the transmission to drive (step 211), and proceeds to the next pulse phase whenever the throttle is pressed again (step 203). If the brake was not pressed (step 210), the system will return to check whether the throttle was pressed (step 208), and so forth, in a cycle until an action, either braking at step 210 or using the throttle 208 to accelerate, takes the vehicle out of the glide phase.

Because the system continuously or continually checks for the accelerator and brake pedal positions via the sensors in the glide phase and prioritizes switching the transmission back to drive (which only requires a fraction of a second, less than typical driver reaction time), there is essentially no time lost when the driver needs to react to some road or traffic condition and take the vehicle out of gliding. As soon as the throttle or the brake is pressed, the system will immediately move the transmission back to drive before the driver even has the time to think about the position of the transmission. Thus, the system provides a substantial safety improvement over a manual pulse and glide, where the driver has to manually switch the transmission, and where any error on the driver's part could possibly lead to an accident. This device will minimize that danger. In addition, having an actuator control the throttle yields more consistent fuel savings.

Retrofit Throttle Actuator and Pedal

Figure 7:
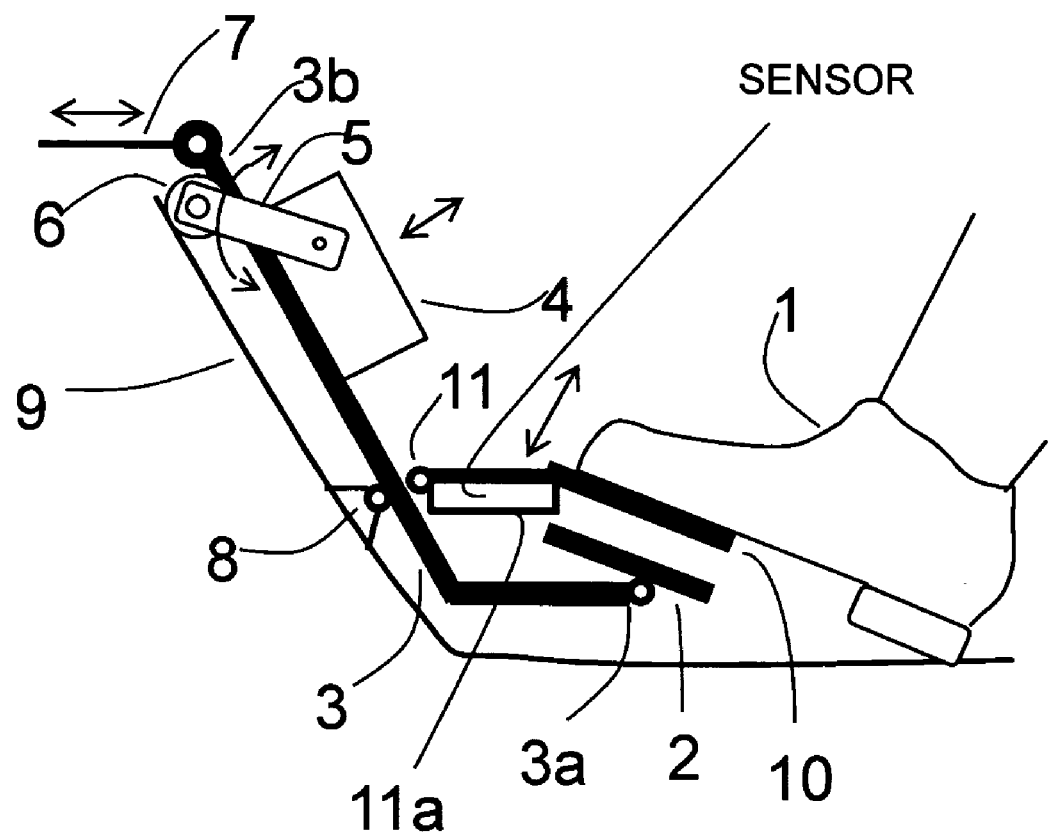
FIG. 7 is a partial schematic view showing one way to implement an add-on throttle actuator.

An embodiment of a throttle actuator for a retrofit version of the system is depicted in FIG. 7. A standard throttle lever 3 is supported by fulcrum-spring assembly 8 in its normal position. In the normal operation of the vehicle with no added components, when the driver's foot 1 exerts enough force to push on accelerator pedal 2, that force pushes down on one end 3a which causes remote end 3b of lever 3 to move towards the right, which then pulls throttle cable 7 towards the right. This pull to the right on throttle cable 7 increases the throttle and accelerates the vehicle. When the driver's foot 1 releases pedal 2, a spring at fulcrum-spring assembly 8 will push remote end 3b of lever 3 and cause throttle cable 7 to move back towards the left, which results in a decrease of the throttle. The above is standard throttle operation and structure.

An add-on feature is a second pedal, i.e., add-on accelerator pedal 10, which has its own spring-fulcrum assembly and axle 11 near existing fulcrum-spring assembly 8 of throttle lever 3. Add-on accelerate pedal 10 is disposed above the vehicle's existing accelerator pedal 2 preferably held there by spring force of spring assembly and axle 11. Add-on pedal 10 stays a certain predetermined distance from accelerator pedal 2 when the driver's foot 1 does not push it. If, however, sufficient force is exerted by the driver's foot 1 to push add-on pedal 10 against this spring force, add-on pedal 10 will touch accelerator pedal 2 so that the driver's foot 1 pushes add-on pedal 10 which in turn pushes accelerator pedal 2. Add-on pedal 10 contains a sensor, such as a potentiometer 11a, connected to fulcrum-spring assembly and axle 11. If the driver's foot 1 pushes down on add-on pedal 10, but add-on pedal 10 does not touch accelerator pedal 2, which would be expected to happen for the majority of the time when driving with the system, the system reads this pedal's position from the pedal sensor and controls the throttle according to the pulse and glide method. The system will yield control of the throttle to the driver when the driver exerts enough force to make the add-on pedal 10 touch the original accelerator pedal 2.

When add-on pedal 10 is totally released, this corresponds to zero percent pedal position (FIG. 3); when add-on pedal 10 is pushed so that it touches accelerator pedal 2, this corresponds to the pedal position at point "b" in FIG. 3 (selected, e.g., at sixty percent). For this range of pedal position, the system controls the throttle in a pulse-width modulation style to operate the vehicle fuel efficiently. As the driver's foot exerts more force the add-on pedal 10 will push and move the accelerator pedal 2, eventually pushing the accelerator pedal 2 to its maximum positions, which corresponds to the point "c" in FIG. 3. For the range of pedal position from where the add-on pedal 10 and accelerator pedal 2 first touch until they are pushed together to the maximum position for the accelerator pedal 2 (from point "b" to point "c" in FIG. 3), the system relinquishes control of the throttle, and the driver controls the throttle directly.

The system can control an installed servo motor 4 to increase the throttle by having servo motor 4 rotate its arm 5 counterclockwise. Wheel 6 of arm 5 pushes against floor 9 of the vehicle, and causes remote end 3b of throttle lever 3 to move toward the right, pulling throttle cable 7 and accelerating the vehicle. If arm 5 turns clockwise, it will release lever 3 and allow fulcrum-spring assembly 8 to push end 3b of throttle lever 3 back towards the left along with throttle cable 7, thus decreasing throttle. The driver's role is simply to hold add-on pedal 10 in some position; the throttle actuator (servo motor 4) rotates its arm 5 counterclockwise and clockwise, moving throttle lever 3 and throttle cable 7, inducing increases or decreases to the throttle. While the add-on modules of the system are controlling the throttle, accelerator pedal 2, connected to throttle lever 3, also moves up and down below add-on pedal 10 and does not touch add-on pedal 10 unless the driver wishes to control the throttle directly by pushing the two pedals together.

To implement the pulse and glide phases to make the engine run at optimal efficiency while maintaining the vehicle at the desired speed, the system controls the throttle with servo motor 4, arm 5, throttle lever 3, and throttle cable 7, which are moved frequently throughout the throttle control process. This saves the driver a lot of trouble, since the driver only needs to hold add-on pedal 10 at some position that corresponds with the speed the driver desires. This method is only an example of one possible method of providing an add-on throttle actuator, and does not mean that the system is restricted to this method to add and control an actuator to automate the throttle. It is also possible for the system to talk to the vehicle's ECU directly through the OBD-II interface and use the throttle actuator built into the vehicle instead of relying on an added actuator device.

Retrofit Actuator for Shifter

Figure 8A:
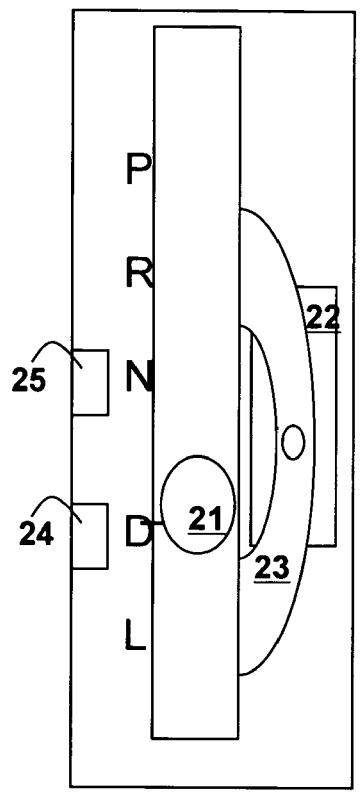
FIGS. 8a, 8b and 8c are schematic diagrams of various positions of an optional add-on transmission actuator for automatic transmission vehicles.
Figure 8B:
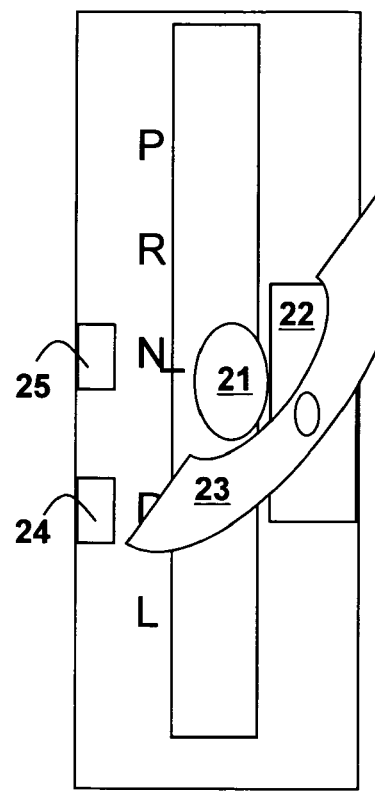
Figure 8C:
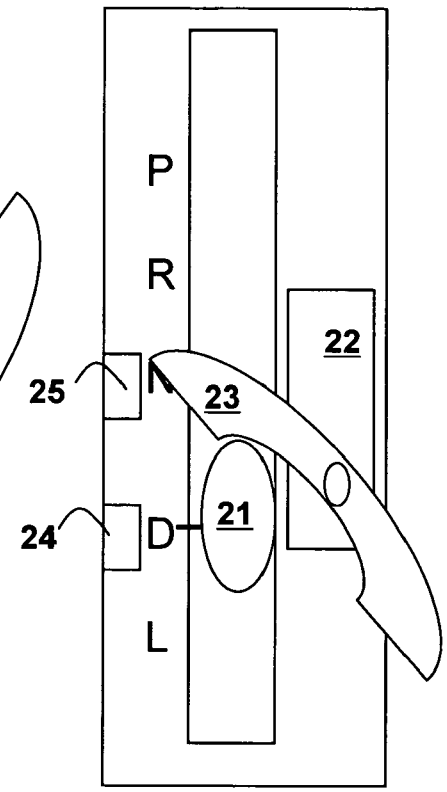

FIGS. 8a, 8b and 8c depict one possible implementation of the actuator used to shift the transmission shift knob on an automatic transmission vehicle (transmission actuator A9 in FIG. 4). However, the scope of this invention is neither limited to automatic transmission vehicles nor to this specific implementation of the actuator. In each of these figures, there is the shift knob 21, servo motor 22, servo motor arm 23, drive position 24, and neutral position 25. The actuator is formed by servo motor 22 and actuator arm 23.

In FIG. 8a, actuator arm 23 is in home position, where it waits for the system (i.e., the processor) to give it an instruction. Before and after each action, the actuator returns to home position. In home position, actuator arm 23 does not have contact with shift knob 1.

In FIG. 8b, actuator arm 23 performs the action of moving shift knob 21 to neutral position 25. When the processor determines that it is appropriate to shift the transmission to neutral to aid the glide phase, it sends a signal to servo motor 22. Servo motor 22 turns arm 23, which pushes shift knob 21 up, from drive position 24 to neutral position 25.

In FIG. 8c, actuator arm 23 performs the action of moving shift knob 21 to drive position 24. This happens when the device detects that either the throttle or the brake is engaged by the driver. The processor sends a signal to servo motor 22, which in turn rotates arm 23 to push shift knob 21 down from neutral position 25 to drive position 24.

Additional Embodiments

The processor and/or indicator for the system may also be embodied into a cell phone, such as an application for an iPhone™ or other smart phone. The processor and/or indicator for the system may also be embodied in a GPS device, such as a navigation system. In such a smart phone or GPS device embodiment, the system could be embodied as the manual version below, although there is no technological reason that the system could not be the automatic version, perhaps embodied with wireless communication between the smart phone or GPS device. Such wireless communication and/or wired communication may be used with any other embodiment as well.

In a manual mode or embodiment of the system, there is no automated control of the throttle and the driver operates the throttle in an "on and off" manner—that is to say, the driver performs the modulation approach (described above with FIG. 2) manually. Since this driving style is unnatural compared to conventional driving and requires effort from the driver to realize, the manual embodiment is not preferred although it is still useful for saving fuel. The manual embodiment of the system is easy to install and is more practical for retrofitting vehicles.

Manual Mode

Figure 9:
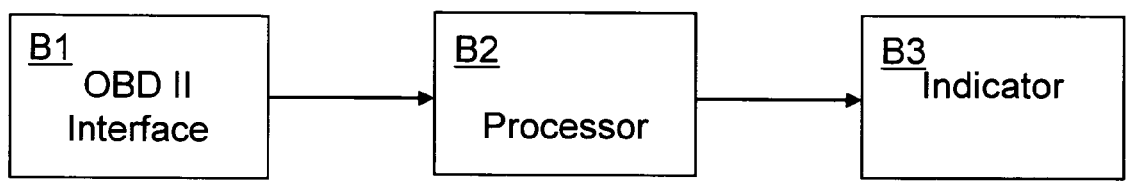
FIG. 9 is a schematic diagram of a complete system in accordance with a simplified and alternative embodiment of the system.

FIG. 9 illustrates the components for a simplified or manual embodiment of the system. This simplified embodiment does not include any actuators, and instead is a "teaching" device that guides the driver to personally (manually) perform the "on and off" throttle control driving style that some other embodiments of the system make automatic. The OBD-II interface B1 communicates back and forth with processor B2, linking the processor B2 with a network of existing sensors onboard the vehicle. The OBD-II interface and its linkage to onboard sensors, the ECM, and other components of vehicles, is well known in the art. The processor B2 sends requests to the vehicle for vehicle data, e.g., engine load, mass air flow rate, throttle position, and vehicle speed through the OBD-II interface B1. (See also, FIG. 4) From the vehicle data obtained via the OBD-II interface B1, processor B2 then analyzes the data and sends commands to indicator B3, which will "communicate" with the driver (provide feedback) to help the driver operate the vehicle fuel efficiently.

In this simplified (manual) embodiment, indicator B3 may provide feedback to the driver via visual signals or auditory signals. As one example, the indicator B3 may simply provide a number indicating the P/F ratio (or a normalized version of the P/F ratio). The driver can see the ratio going up or down, and can adjust the throttle accordingly. The driver would press the accelerator more as long as the P/F ratio is rising (the driver is still trying to get up to the peak), and would release the accelerator (ease up) in response to a falling P/F ratio (the driver passed the peak). When the driver gets beyond the desired speed, the driver would release the pedal entirely and, when desirable and legal, put the vehicle into neutral. When the throttle has been released, the P/F ratio would preferably clear until the driver hits the accelerator again.

In another example, the indicator may use different colored lights that the driver can see peripherally without taking his or her eyes off the road. If no lights are lit, it means that the driver needs to press the throttle more; if the green light is lit, it means that the throttle's position is just right and should be maintained; if the red light is lit, it means that the throttle is too much, and needs to be released a little bit.

The brightness and the position of the lights can be adjusted by the driver so that when the lights are lit the driver can perceive them with peripheral vision, and the brightness of the lights can automatically adjust according to ambient lighting conditions (sunny vs cloudy days, day vs night), to give the driver a comfortable and safe experience. Similarly, with auditory cues, no sound would signify that more throttle is needed, a first note would signify that the throttle is just right and should be maintained, and a second note would signify that the throttle needs to be released a bit. The volume and pitch of these auditory signals would also be adjustable so as not to irritate the driver.

Anytime the processor calls for maintaining current throttle in the manual mode, the light is green (or other designated feedback to the driver). Anytime the processor calls for releasing the throttle a bit, the light is red (or other designated feedback). Anytime the processer calls for pressing the throttle (until the green light comes on), there is no light (or other designated feedback). The processor and indicator only go so far as to let the driver know whether the driver should press down, release partially, or maintain the throttle to induce the engine to work in its most efficient state at any given moment. This only helps the driver manage the pulse periods of the pulse and glide modulation driving style, making sure that the pulse periods use the engine in the most efficient state.

The driver is responsible for making the decision as to when to start the glide phase by completely releasing the throttle. While the throttle is completely released (glide phase), no indicator lights are on (or other designated feedback).

Although the system has no need for previously stored data, optionally using artificial intelligence to "learn" and store the sets of parameters that have produced the highest P/F ratios in past operations for each speed and gear may save time and help the system find the current maximum P/F ratio, and thus the most fuel efficient engine state, more quickly.

Although the invention has been described using specific terms, devices, and/or methods, such description is for illustrative purposes of the preferred embodiment(s) only. Changes may be made to the preferred embodiment(s) by those of ordinary skill in the art without departing from the scope of the present invention, which is set forth in the following claims. In addition, it should be understood that aspects of the preferred embodiment(s) generally may be interchanged in whole or in part.

What is claimed is:

1. A system for controlling a vehicle having a combustible fuel powered engine, the system comprising:
   i. means for sensing a first parameter proportional to power and for sensing a second parameter proportional to fuel flow;
   ii. a controller for receiving the first and second parameters and dynamically determining a power to fuel ratio (P/F) by dividing the first parameter by the second parameter, and for comparing the P/F ratio to a previously determined P/F ratio;

iii. means for selectively adjusting, by selecting one of maintaining, increasing and decreasing, throttle to maximize the P/F ratio at any given moment up to a predetermined speed, wherein the controller increases throttle in response to the P/F ratio being greater than the previously determined P/F ratio when the previous action was to increase throttle, wherein the controller increases throttle in response to the P/F ratio being less than the previously determined P/F ratio when the previous action was to decrease throttle, wherein the controller decreases throttle in response to the P/F ratio being greater than the previously determined P/F ratio when the previous action was to decrease throttle, and wherein the controller decreases throttle in response to the P/F ratio being less than the previously determined P/F ratio when the previous action was to increase throttle; and iv. means for allowing the vehicle to coast upon reaching the predetermined speed, and when vehicle speed has dropped a predetermined amount, enabling the means for selectively adjusting to increase vehicle speed again.

2. The system of claim 1, wherein the means for selectively adjusting comprises a servo-motor mounted on an accelerator pedal of the vehicle.

3. The system of claim 1, wherein the means for selectively adjusting comprises an existing throttle actuator in the vehicle for cruise control.

4. The system of claim 1, wherein the means for allowing the vehicle to coast comprises means for initiating a shift of the vehicle's transmission from drive to neutral in response to a glide control signal from the controller, the controller initiating the glide control signal upon the vehicle reaching the predetermined speed, and for initiating a shift of the vehicle's transmission from neutral to drive in response to a drive control signal from the controller, the controller initiating the drive control signal upon the vehicle dropping to the predetermined amount below the predetermined speed.

5. The system of claim 1, wherein there is an accelerator sensor for determining accelerator position, and the controller determines the predetermined speed based on a signal from the accelerator sensor.

6. The system of claim 1, wherein the means for sensing comprises accessing the vehicle's existing sensors via OBD II protocol communications.

7. The system of claim 1, wherein the controller is disposed within the vehicle's existing electronic control module.

8. The system of claim 1, wherein there is a means for actuating transmission gear changes, and the controller, in addition to deciding whether to increase or decrease fuel supplied to the engine via the throttle, also makes a decision as to whether there should be a shift of transmission from a lower to a higher gear, or from a higher to a lower gear, for increasing the P/F ratio to a maximum.

9. The system of claim 1, wherein system further comprises:
i. means for sensing when a threshold speed is attained by the vehicle;
ii. means for accelerating beyond the threshold speed;
iii. means for sensing a first duration of time (P) during which accelerating beyond the threshold speed occurs; and
iv. wherein the controller further comprises means for initiating coasting of the vehicle upon achieving a predetermined condition, and for determining a second duration of time (G) for coasting as a function of the first duration of time, and for re-initiating accelerating after the second duration of time.

10. The system of claim 9, wherein the second duration of time (G) is equal to the first duration of time (P) divided by a constant (X).

11. A method for controlling a vehicle having a combustible fuel powered engine, the method comprising the steps of:
i. sensing a first parameter (P) proportional to power;
ii. sensing a second parameter (F) proportional to fuel flow;
iii. dynamically determining a power to fuel ratio (P/F); comparing the P/F ratio to a previously determined P/F ratio;
iv. incrementally increasing or decreasing throttle in response to an increasing or decreasing P/F ratio; and
v. allowing the vehicle to coast upon reaching a predetermined speed; and when vehicle speed has dropped by a predetermined amount, repeating the steps (i) to (iv).

12. The method of claim 11, wherein in the step (iv) of increasing or decreasing throttle, the throttle is adjusted automatically.

13. The method of claim 12, wherein the throttle is increased or decreased automatically by using a servo-motor.

14. The method of claim 12, wherein the throttle is increased or decreased automatically by using an existing throttle actuator in the vehicle for cruise control.

15. The method of claim 11, wherein the step of coasting includes automatically shifting the vehicle's transmission from drive to neutral upon reaching the predetermined speed, and a step of automatically shifting from neutral to drive in response to the vehicle's speed dropping by the predetermined amount below the predetermined speed at the end of coasting.

16. The method of claim 11, wherein there is a step of determining a position of an accelerator pedal of the vehicle for determining the predetermined speed.

17. The method of claim 11, wherein there is a step of using existing sensors of the vehicle, accessed through OBD II protocol communications, for performing the steps of (i) and (ii) of sensing.

18. The method of claim 11, wherein there is a step of using an existing electronic control module of the vehicle for performing the steps of (iii) dynamically determining and (iv) incrementally increasing or decreasing throttle.

19. The method of claim 11, wherein the vehicle has a transmission and there is a controller, and there is a step of using the controller determine whether the transmission should shift gear from a lower gear to a higher gear or from a higher gear to a lower gear to increase the P/F ratio.

20. The method of claim 11, further comprising the steps of:
i. sensing when a threshold speed is attained by the vehicle;
ii. accelerating the vehicle beyond the threshold speed;
iii. sensing a first duration of time (P) during which accelerating beyond the threshold speed occurs; and
iv. initiating coasting of the vehicle upon achieving a predetermined condition, and determining a second duration of time (G) for coasting as a function of the first duration of time, and for re-initiating accelerating after the second duration of time.

21. The method of claim 20, wherein the second duration of time (G) is equal to the first duration of time (P) divided by a constant (X).

22. The method of claim 20, wherein the second duration of time (G) is equal to the first duration of time (P) divided by a constant (X'), then subtracting the first duration of time (P).

23. The system of claim 22, wherein the operator of the throttle is the throttle actuator and the throttle is increased, decreased, or maintained automatically to operate the engine at optimal efficiency by maximizing the P/F ratio.

24. The system of claim 23, wherein the controller includes means for initiating adjustments to the throttle to maintain the engine working at optimal efficiency with the P/F ratio maximized for a certain period of time, and for initiating a complete release of the throttle to allow the vehicle to coast in between periods of inducing the engine to work at optimal efficiency.

25. The system of claim 23, further comprising means for sensing the accelerator pedal position, and the controller further comprises means for translating the accelerator pedal position into an alteration to a duration of time during which the controller maintains the engine working at optimal efficiency and to a duration of time during which the controller initiates a complete release of the throttle to allow the vehicle to coast in between periods of inducing the engine to work at optimal efficiency.

26. A system for controlling a vehicle having a combustible fuel powered engine, the system comprising:
  i. means for sensing during operation of the vehicle by an operator at predetermined intervals a first real time parameter proportional to power and for sensing during operation of the vehicle by the operator at the predetermined intervals a second real time parameter proportional to fuel flow;
  ii. a controller for receiving the first and second real time parameters and dynamically determining a real time current power to fuel ratio (P/F) during operation of the vehicle by the operator at the predetermined intervals and comparing the real time current P/F ratio to a previously determined real time current P/F ratio during operation of the vehicle by the operator determined at a previous last one of the predetermined intervals;
  iii. means for providing an indication to a driver of the vehicle for increasing throttle to maximize the P/F ratio based on the comparison of the real time current P/F ratio and the previously determined real time current P/F ratio at the previous last one of the predetermined intervals, and
  iv. means for providing another indication to the driver of the vehicle for reducing throttle to maximize the P/F ratio based on the comparison of the real time current P/F ratio and the previously determined real time current P/F ratio at the previous last one of the predetermined intervals.

27. A method for controlling a vehicle having a combustible fuel powered engine, the method comprising the steps of:
  i. sensing during operation of the vehicle by an operator at predetermined intervals a first real time parameter proportional to power;
  ii. sensing during operation of the vehicle by the operator at the predetermined intervals a second real time parameter (f) proportional to fuel flow;
  iii. dynamically determining a real time current power to fuel ratio (P/F) during operation of the vehicle by the operator at the predetermined intervals;
  iv. comparing the real time current P/F ratio to a previously determined real time current P/F ratio during operation of the vehicle by the operator determined at a previous last one of the predetermined intervals;
  v. providing a first indication to a driver of the vehicle for increasing throttle to maximize the real time current P/F ratio based on the comparison of the real time current P/F ratio and the previously determined real time current P/F ratio at the previous last one of the predetermined intervals;
  vi. providing a second indication to a driver of the vehicle for maintaining the throttle in the same position to maximize the real time current P/F ratio based on the comparison of the real time current P/F ratio and the previously determined real time current P/F ratio at the previous last one of the predetermined intervals; and
  vii. providing a third indication to the driver of the vehicle for decreasing throttle to maximize the real time current P/F ratio based on the comparison of the real time current P/F ratio and the previously determined real time current P/F ratio.

28. A system for controlling a vehicle having a combustible fuel powered engine, the system comprising:
  i. means for sensing during operation of the vehicle by an operator at predetermined intervals a first real time parameter proportional to power and for sensing during operation of the vehicle by the operator at the predetermined intervals a second real time parameter proportional to fuel flow;
  ii. a controller for receiving the first and second real time parameters and dynamically determining a real time current power to fuel ratio (P/F) during operation of the vehicle by the operator at the predetermined intervals, and comparing the real time current P/F ratio to a previously determined real time current P/F ratio during operation of the vehicle by the operator determined at a previous one of the predetermined intervals;
  iii. the controller further comprising means for generating signals to an operator of the throttle as to whether the throttle should be increased, decreased, or maintained in order to maximize the P/F ratio and thus maintain the engine running at optimal efficiency based on the comparison of the real time current P/F ratio and the previously determined real time current P/F ratio.

29. A system for controlling a vehicle having a combustible fuel powered engine, the system comprising:
  means for sensing a first parameter proportional to power and for sensing a second parameter proportional to fuel flow;
  a controller for receiving the first and second parameters and dynamically determining a power to fuel ratio (P/F), and comparing the current P/F ratio to a previously determined P/F ratio;
  the controller further comprising means for generating signals to an operator of the throttle as to whether the throttle should be increased, decreased, or maintained in order to maximize the P/F ratio and thus maintain the engine running at optimal efficiency,
  wherein the operator of the throttle is a throttle actuator and the throttle is increased, decreased, or maintained automatically to operate the engine at optimal efficiency by maximizing the P/F ratio.

30. The system of claim 29, wherein the controller includes means for initiating adjustments to the throttle to maintain the engine working at optimal efficiency with the P/F ratio maximized for a certain period of time, and for initiating a complete release of the throttle to allow the vehicle to coast in between periods of inducing the engine to work at optimal efficiency.

31. The system of claim 29, further comprising means for sensing the accelerator pedal position, and the controller further comprises means for translating the accelerator pedal position into an alteration to a duration of time during which the controller maintains the engine working at optimal efficiency and to a duration of time during which the controller initiates a complete release of the throttle to allow the vehicle to coast in between periods of inducing the engine to work at optimal efficiency.

32. The system of claim 29, wherein there is a means for sensing the accelerator pedal position and the system maintains the engine working at optimal efficiency up to a predetermined speed, then allows the vehicle to coast until the vehicle speed drops by a predetermined amount below the predetermined speed, upon which the system increases throttle to use the engine in its most efficient state again.

33. A system for controlling a vehicle having a combustible fuel powered engine, the system comprising:
  i. means for detecting engine efficiency;
  ii. means for increasing and decreasing throttle to induce and maintain the engine at optimal efficiency;
  iii. a controller for initiating adjustments to the throttle to maintain the engine working at optimal efficiency for a certain period of time, and for initiating a complete release of the throttle to allow the vehicle to coast in between periods of inducing the engine to work at optimal efficiency;
  iv. a sensor for detecting an accelerator pedal position, and wherein the controller translates the accelerator pedal position into a drivers' desired speed, wherein until the driver's desired speed is reached, the controller maintains the engine working at optimal efficiency and when the driver's desired speed is reached, the controller initiates a complete release of the throttle to allow the vehicle to coast.

34. The system of claim 33, wherein the means for detecting engine efficiency comprises sensing a first parameter proportional to power and a second parameter proportional to fuel flow, and determining a power to fuel (P/F) ratio dynamically, and wherein a most recently determined P/F ratio is compared with a previous value of the P/F ratio.

35. The system of claim 33, wherein the means for detecting comprises existing sensors of the vehicle and the controller accesses these signals via OBD II protocol communications.

36. The system of claim 33, wherein the controller is disposed within the vehicle's existing electronic control module.

37. The system of claim 33, wherein the controller includes means for initiating a shift of a vehicle transmission from drive to neutral in response to a glide control signal from the controller, and means for initiating a shift of the vehicle's transmission from neutral to drive in response to a drive control signal from the controller.

38. The system of claim 33, wherein the accelerator pedal position translates into a predetermined speed, there is a means for sensing vehicle speed, and the controller operates the throttle to induce the engine to accelerate the vehicle up to a predetermined threshold speed at optimal efficiency, then initiates a complete release of the throttle to allow the vehicle to coast upon reaching that threshold speed, then initiates acceleration again when the vehicle speed has dropped to a predetermined amount below the predetermined speed; the controller thus initiates alternating periods of acceleration and coasting, while maintaining the engine at optimal efficiency threshold during acceleration periods.

39. The system of claim 33, wherein the accelerator pedal position translates into a predetermined ratio P/(P+G) where P is the first duration of time during which the controller operates the engine to run fuel efficiently and G is the second duration of time during which the vehicle coasts, and the accelerator pedal position directly controls the ratio P/(P+G).

40. A method for controlling a vehicle having a combustible fuel powered engine, the method comprising the steps of:
  i. sensing the engine's efficiency or state in real time;
  ii. determining how to induce the engine to run or maintain the engine running at optimal efficiency from the current engine state;
  iii. selectively increasing and decreasing throttle to induce the engine to run or maintain the engine running at optimal efficiency;
  iv. repeating steps (i) to (iii) until a predetermined speed or a predetermined duration of time has been reached;
  v. allowing the vehicle to coast upon reaching a predetermined speed or a predetermined duration of time;
  vi. when either the vehicle speed has dropped by a predetermined amount, or another predetermined duration of time has passed, repeat steps (i) to (v) above.

41. The method of claim 40, wherein the step of sensing the engine's efficiency in step (i) is accomplished by sensing a first parameter proportional to power and a second parameter proportional to fuel flow, generating a power over fuel ratio (P/F ratio), and wherein the step of determining how to run the engine at optimal efficiency includes comparing the current P/F ratio to a previously determined P/F ratio.

42. The method of claim 40, wherein in the step (iii) of increasing or decreasing the throttle, the throttle is adjusted automatically using a throttle actuator.

43. The method of claim 42, wherein the throttle is increased automatically by using an existing throttle actuator for cruise control in the vehicle.

44. The method of claim 40, wherein the step of coasting (v) includes shifting the vehicle's transmission from drive to neutral during the coasting period and shifting the vehicle's transmission from neutral to drive at the end of the coasting period.

45. The method of claim 40, wherein in step (i) of sensing sensors already existing in the vehicle are used, and accessed through OBD II protocol communications.

46. The method of claim 40, wherein there is a step of using an existing electronic central module for making decisions and initiating actions in steps (ii) to (vi).

47. The method of claim 40, wherein there is an accelerator pedal position sensor and the accelerator pedal position determines the predetermined speed in steps (iv) to (vi).

48. The method of claim 40, wherein there is an accelerator pedal position sensor and the accelerator pedal position determines at least one of the predetermined duration of time (P) in step (iv), the predetermined duration of time (G) in step (v), and the ratio P/(P+G).

* * * * *